US012198873B2

(12) United States Patent
Ku et al.

(10) Patent No.: US 12,198,873 B2
(45) Date of Patent: Jan. 14, 2025

(54) ILLUMINATED KEYSWITCH STRUCTURE

(71) Applicants: DARFON ELECTRONICS (HUAIAN) CO., LTD., Jiangsu (CN); DARFON ELECTRONICS CORP., Taoyuan (TW)

(72) Inventors: Yu-Chuan Ku, Taoyuan (TW); Wen-Ming Hsu, Taoyuan (TW); Yuming Huang, Taoyuan (TW)

(73) Assignees: DARFON ELECTRONICS (HUAIAN) CO., LTD., Jiangsu (CN); DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 17/909,991

(22) PCT Filed: May 26, 2022

(86) PCT No.: PCT/CN2022/095234
§ 371 (c)(1),
(2) Date: Sep. 8, 2022

(87) PCT Pub. No.: WO2022/247907
PCT Pub. Date: Dec. 1, 2022

(65) Prior Publication Data

US 2024/0203671 A1 Jun. 20, 2024

(30) Foreign Application Priority Data

May 27, 2021 (CN) ........................ 202110583485.1

(51) Int. Cl.
*H01H 13/02* (2006.01)

(52) U.S. Cl.
CPC ................................ *H01H 13/023* (2013.01)

(58) Field of Classification Search
CPC .................................................... H01H 13/023
See application file for complete search history.

(56) References Cited

U.S. PATENT DOCUMENTS 6,790,003 B1 9/2004 Hu
2009/0067153 A1 3/2009 Takeda
(Continued)

FOREIGN PATENT DOCUMENTS

CN 201673831 U 12/2010
CN 201812704 U 4/2011
(Continued)

*Primary Examiner* — Christopher E Dunay
(74) *Attorney, Agent, or Firm* — Winston Hsu

(57) ABSTRACT

The invention discloses an illuminated keyswitch structure, which includes a base plate, a keycap, and a plurality of light-emitting dies. The base plate has a through hole. The keycap is movably disposed above the base plate in a vertical direction. The light-emitting dies are disposed under the keycap. The light-emitting dies are not higher than the base plate. The light-emitting dies are located within a projection of the through hole in the vertical direction. At least two of the light-emitting dies are arranged parallel to an hole edge of the through hole. In the illuminated keyswitch structure of the invention, distances from the light-emitting dies that are arranged parallel to the hole edge to the hole edge are close to each other, and light of different colors emitted by said light-emitting dies travels through the hole edge at similar distances, thereby suppressing uneven light mixing and color deviation.

14 Claims, 16 Drawing Sheets

(56) References Cited

U.S. PATENT DOCUMENTS

| | | | | |
|---|---|---|---|---|
| 2019/0066947 | A1 | 2/2019 | Chiu | |
| 2019/0339788 | A1 | 11/2019 | Yang | |
| 2021/0358699 | A1 | 11/2021 | Ruff | |
| 2024/0036245 | A1* | 2/2024 | Tsai | H01H 13/83 |
| 2024/0096567 | A1* | 3/2024 | Chen | H01H 13/83 |
| 2024/0112870 | A1* | 4/2024 | Chen | H01H 13/83 |
| 2024/0118480 | A1* | 4/2024 | Chen | H01H 13/14 |
| 2024/0134112 | A1* | 4/2024 | Chen | G02B 6/0091 |

FOREIGN PATENT DOCUMENTS

| | | | |
|---|---|---|---|
| CN | 201927524 | U * | 8/2011 |
| CN | 103218051 | A | 7/2013 |
| CN | 203966912 | U | 11/2014 |
| CN | 104332340 | A | 2/2015 |
| CN | 112673444 | A | 4/2021 |
| KR | 10-0752517 | | 8/2007 |
| TW | M386540 | U1 | 8/2010 |
| TW | M403052 | U1 | 5/2011 |
| TW | M410323 | U1 | 8/2011 |
| TW | M413165 | U1 | 10/2011 |
| TW | M419150 | U1 | 12/2011 |
| TW | M443926 | U | 12/2012 |
| TW | M448728 | U | 3/2013 |
| TW | 201413116 | A | 4/2014 |
| TW | M514602 | U | 12/2015 |
| TW | M519314 | U | 3/2016 |
| TW | M538231 | U | 3/2017 |
| TW | I603357 | B | 10/2017 |
| TW | 201810331 | A | 3/2018 |
| TW | 201816823 | A | 5/2018 |
| TW | M569084 | U | 10/2018 |
| TW | I642075 | B | 11/2018 |
| TW | I648758 | B | 1/2019 |
| TW | 201928207 | A | 7/2019 |
| TW | 202029526 | A | 8/2020 |
| TW | 202209376 | A | 3/2022 |

* cited by examiner

ILLUMINATED KEYSWITCH STRUCTURE

BACKGROUND OF THE INVENTION

1. Field of the Invention

The present invention relates to a keyswitch structure, and more particularly to an illuminated keyswitch structure.

2. Description of the Prior Art

One-to-one illuminated keys are usually provided with a light source under each keycap. The light source is used to emit light to form a backlight. When the keycap has a permeable area corresponding to characters such as letters or symbols, the corresponding light source that is usually disposed opposite to the character emits light toward the characters. In actual products, there are often other components between the light source and the permeable area of the keycap, such as supports, base plates, circuit boards, etc., which interfere with the light transmission path and cause uneven color of the characters on the keycap. In the case where the light source can emit light of multiple colors, the problem of serious color deviation also occurs.

SUMMARY OF THE INVENTION

In view of the problems in the prior art, an objective of the invention is to provide an illuminated keyswitch structure, in which a plurality of light-emitting dies are arranged parallel to a structural edge of a base plate that is disposed above the light-emitting dies, so as to suppress the influence of the structure edge on the mixing of light emitted by the light-emitting dies.

In order to achieve the above purpose, the present invention proposes an illuminated keyswitch structure, which includes a base plate, a keycap, and a plurality of light-emitting dies. The base plate has a through hole. The keycap is movably disposed above the base plate in a vertical direction. The plurality of light-emitting dies are disposed under the keycap. The plurality of light-emitting dies are not higher than the base plate. The plurality of light-emitting dies are located within a projection of the through hole in the vertical direction. At least two of the plurality of light-emitting dies are arranged parallel to an hole edge of the through hole.

As an optional technical solution, the plurality of light-emitting dies are all arranged parallel to the hole edge.

As an optional technical solution, the illuminated keyswitch structure further includes a switch circuit board. The switch circuit board is disposed under the keycap and above the plurality of light-emitting dies. Therein, the switch circuit board includes a switch contact pad. A projection of the switch contact pad in the vertical direction is located within a projection of the through hole in the vertical direction. The projection of the switch contact pad in the vertical direction has a flat edge. The at least two of the plurality of light-emitting dies are arranged parallel to the flat edge.

As an optional technical solution, there is a light-emitting distance between the plurality of light-emitting dies and the switch contact pad in a horizontal direction. The light-emitting distance is between 0.3 mm and 0.5 mm.

As an optional technical solution, a portion of a profile of the projection of the through hole in the vertical direction is parallel to a portion of a profile of the projection of the switch contact pad in the vertical direction.

As an optional technical solution, the plurality of light-emitting dies are arranged in a polygonal shape.

As an optional technical solution, at least two of the plurality of light-emitting dies are arranged perpendicular to the hole edge.

As an optional technical solution, the base plate has an outer plate edge closest to the plurality of light-emitting dies in a horizontal direction. There is a light-emitting distance between the plurality of light-emitting dies and the outer plate edge in the horizontal direction. The light-emitting distance is between 4.8 mm and 7.7 mm.

As an optional technical solution, the plurality of light-emitting dies are fixed on a light source circuit board. The light source circuit board is under the base plate.

The present invention also proposes another illuminated keyswitch structure, which includes a keycap and a plurality of light-emitting dies. The keycap is movably disposed in a vertical direction. A coverage space of the keycap in the vertical direction has a heterochromatic sensitive area. The plurality of light-emitting dies are arranged under the keycap. The plurality of light-emitting dies emit light of different colors upward to illuminate the keycap. Distances from the plurality of light-emitting dies to the heterochromatic sensitive area are close to each other. Therein, the heterochromatic sensitive area is an end of a permeable indicator area of the keycap. The permeable indicator area has a lengthwise direction. The plurality of light-emitting dies are arranged under the permeable indicator area perpendicular to the lengthwise direction and the vertical direction. The plurality of light-emitting dies are located at a same side of a projection of the heterochromatic sensitive area in the vertical direction.

The present invention also proposes another illuminated keyswitch structure, which includes a keycap, at least one first light-emitting die, at least one second light-emitting die and at least one third light-emitting die. The keycap is movably disposed in a vertical direction. The keycap has a first permeable character closest to a first side edge of the keycap. The keycap has a second permeable character closest to a second side edge of the keycap. The first side edge and the second side edge are parallel and opposite. The at least one first light-emitting die, the at least one second light-emitting die and the at least one third light-emitting die are disposed under the keycap. The at least one first light-emitting die, the at least one second light-emitting die and the at least one third light-emitting die have gaps with each other and produce light of different colors. The first light-emitting die and the second light-emitting die are arranged in a straight line with edges parallel to each other. The third light-emitting die is not located within a union range of the first light-emitting die and the second light-emitting die. Therein, distances from the first light-emitting die and the second light-emitting die to the first permeable character are close to each other. Distances from the first light-emitting die and the second light-emitting die to the second permeable character are close to each other.

As an optional technical solution, a line connecting the first permeable character and the second permeable character passes through a union range of the first light-emitting die, the second light-emitting die and the third light-emitting die.

As an optional technical solution, a line connecting the first permeable character and the second permeable character passes through the third light-emitting die.

As an optional technical solution, the first permeable character and the second permeable character define a permeable indicator area. The permeable indicator area defines a long axis perpendicular to a line connecting the first light-emitting die and the second light-emitting die.

As an optional technical solution, the first permeable character and the second permeable character define a permeable indicator area. The permeable indicator area defines a long axis perpendicular to a line connecting the first light-emitting die and the second light-emitting die. A center of a union range of the first light-emitting die, the second light-emitting die and the third light-emitting die is located at a center point of the long axis.

As an optional technical solution, the first permeable character and the second permeable character define a permeable indicator area, and there is no other light-emitting part under the permeable indicator area, except for the first light-emitting die, the second light-emitting die and the third light-emitting die.

The present invention also proposes another illuminated keyswitch structure, which includes a first support, a second support, a keycap and a plurality of light-emitting dies. The second support is disposed opposite to the first support. The keycap is supported on the first support and the second support and is movable in a vertical direction through the first support and the second support. A coverage space of the keycap in the vertical direction has a heterochromatic sensitive area. The plurality of light-emitting dies are arranged under the keycap. The plurality of light-emitting dies emit light of different colors upward to illuminate the keycap. Distances from the plurality of light-emitting dies to the heterochromatic sensitive area are close to each other. Therein, the heterochromatic sensitive area is a gap projection between the first support and the second support. The plurality of light-emitting dies as a whole does not overlap the gap projection.

As an optional technical solution, the plurality of light-emitting dies are disposed under the first support, and the light emitted by the plurality of light-emitting dies passes through the first support to illuminate the keycap. Alternatively, the plurality of light-emitting dies are disposed under the second support. The light emitted by the plurality of light-emitting dies passes through the second support to illuminate the keycap.

As an optional technical solution, when the plurality of light-emitting dies are disposed under the first support, the plurality of light-emitting dies are arranged in an arrangement direction, the first support has a frame portion, a projection of the frame portion in the vertical direction has a lengthwise direction, and the lengthwise direction is parallel to the arrangement direction. when the plurality of light-emitting dies are disposed under the second support, the plurality of light-emitting dies are arranged in an arrangement direction, the second support has a frame portion, a projection of the frame portion in the vertical direction has a lengthwise direction, and the lengthwise direction is parallel to the arrangement direction.

As an optional technical solution, the keycap has a permeable indicator area. The first support and the second support are pivotally connected with each other about a pivot axis. The pivot axis is parallel to a lengthwise direction of the permeable indicator area.

The beneficial effects of the present invention are: in the illuminated keyswitch structures of the present invention, the plurality of light-emitting dies are located within the projection of the through hole of the base plate in the vertical direction, and at least two of the plurality of light-emitting dies are arranged parallel to the hole edge of the through hole. Thereby, the distances from the light-emitting dies that are arranged parallel to the hole edge to the hole edge are close to each other, and the light of different colors emitted by said light-emitting dies travels through the hole edge at similar distances, thereby suppressing uneven light mixing and color deviation. In the illuminated keyswitch structures provided by the technical solution according to the present invention, also through the specific arrangement of the plurality of light-emitting dies relative to the heterochromatic sensitive area, the mixing effect of the light of different colors from the plurality of light-emitting dies reaching the heterochromatic sensitive area is improved, so as to suppress the negative impact of the gap between the supports, trace segments and switch contact pad of the switch circuit board, and insufficient mixing distance on the mixing of light emitted by the light-emitting dies.

These and other objectives of the present invention will no doubt become obvious to those of ordinary skill in the art after reading the following detailed description of the preferred embodiment that is illustrated in the various figures and drawings.

DETAILED DESCRIPTION

In order to have a further understanding of the purpose, structure, features, and functions of the present invention, the following describes in detail with reference to the embodiments.

Figure 1:
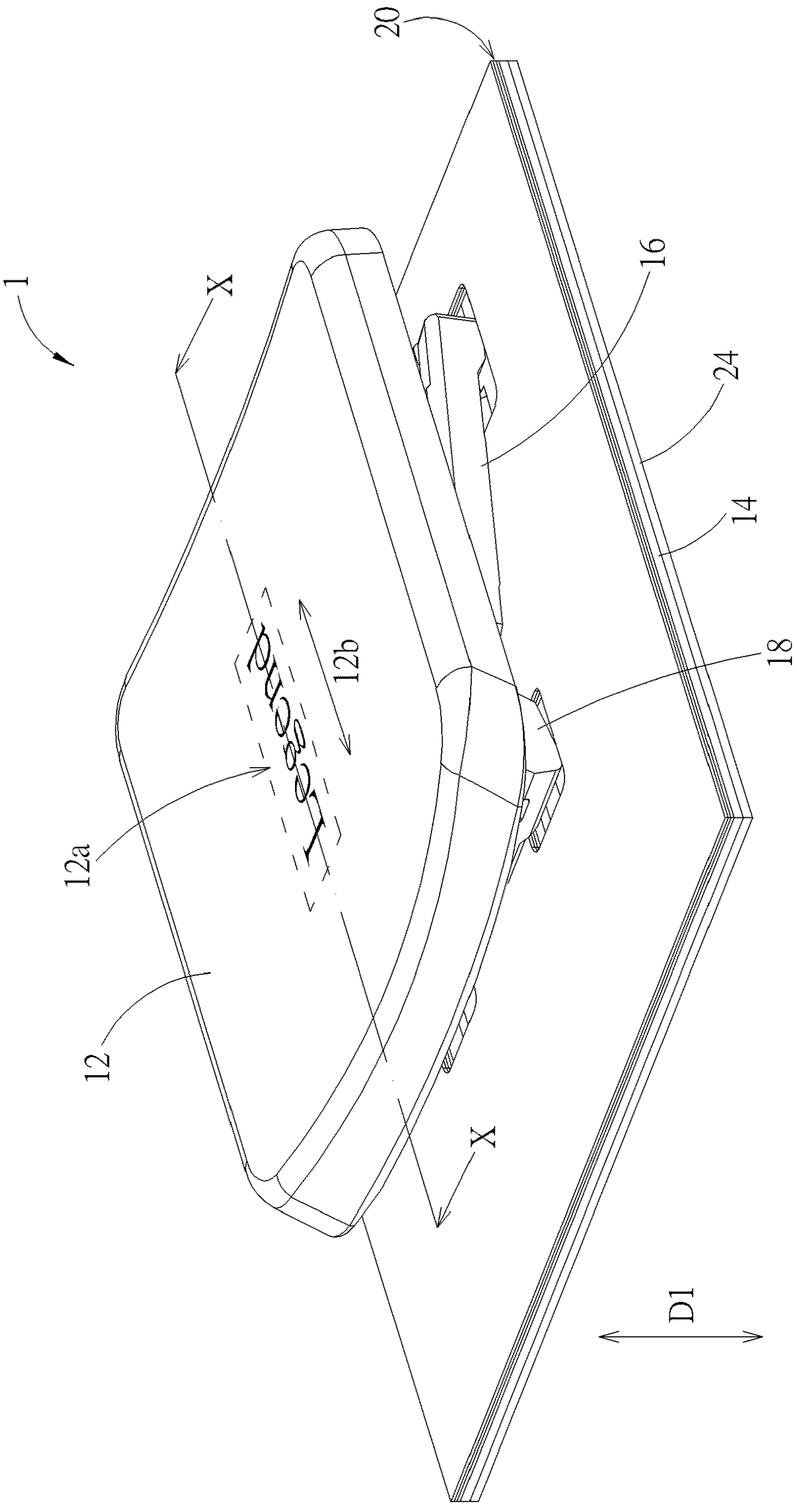
FIG. 1 is a schematic diagram illustrating an illuminated keyswitch structure according to an embodiment.
Figure 2:
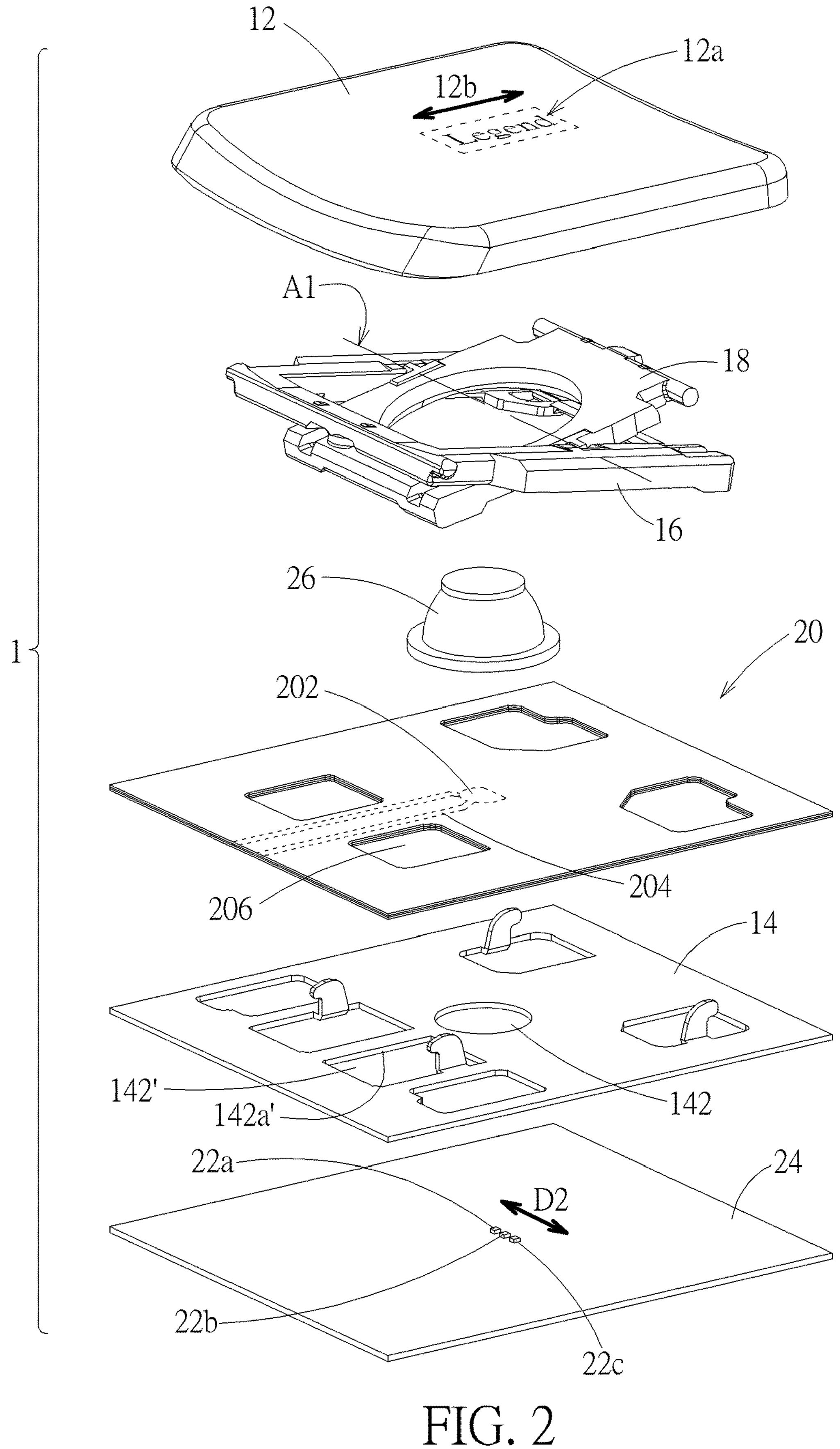
FIG. 2 is an exploded view of the illuminated keyswitch structure in FIG. 1.
Figure 3:
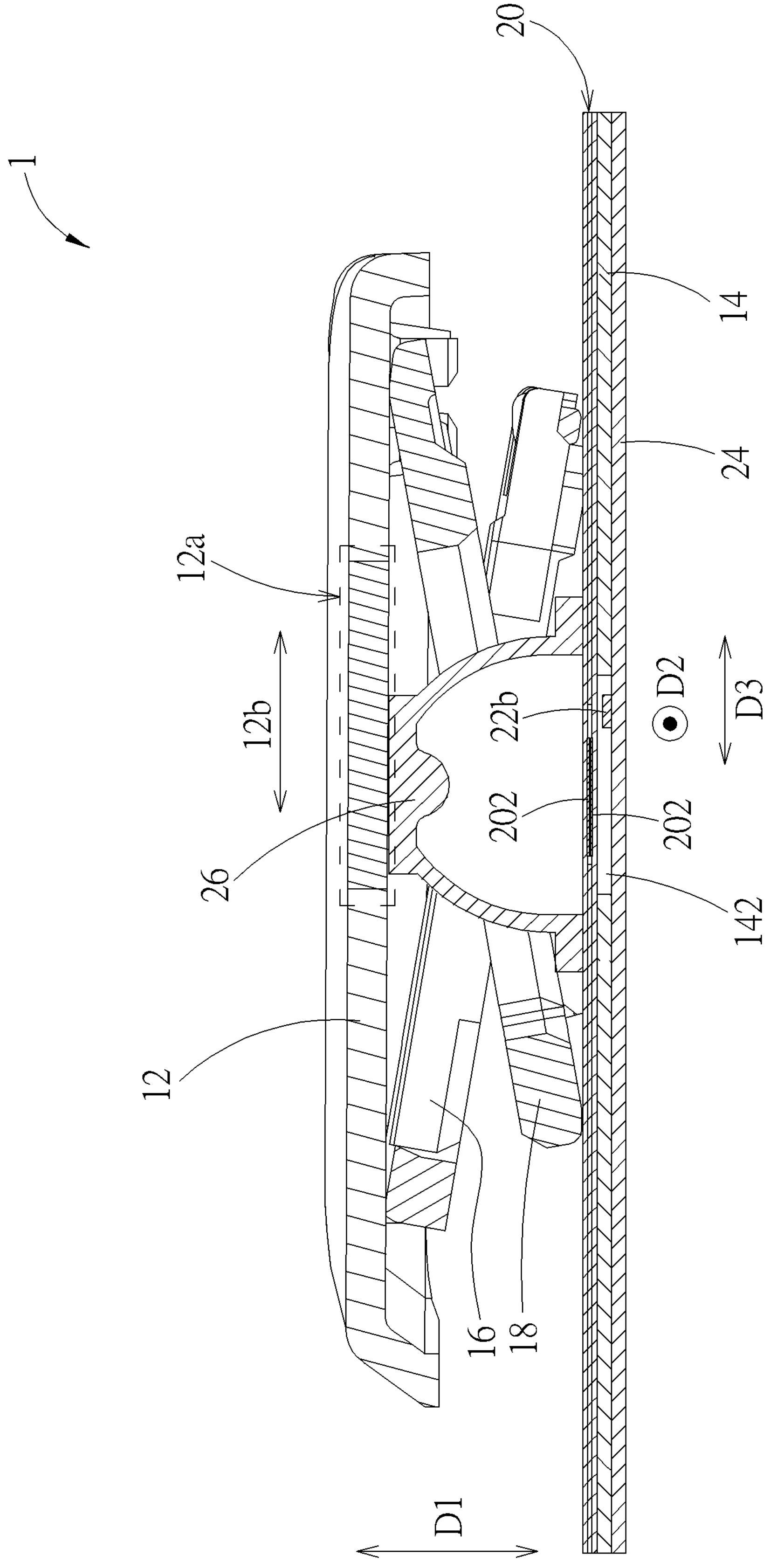
FIG. 3 is a sectional view of the illuminated keyswitch structure along the line X-X in FIG. 1.

Please refer to FIG. 1 to FIG. 3. FIG. 1 is a schematic diagram illustrating an illuminated keyswitch structure according to an embodiment. FIG. 2 is an exploded view of the illuminated keyswitch structure in FIG. 1. FIG. 3 is a sectional view of the illuminated keyswitch structure along the line X-X in FIG. 1. An illuminated keyswitch structure 1 according to an embodiment includes a keycap 12, a base plate 14, a first support 16, a second support 18, transparent switch circuit board 20, and one or more light-emitting dies (for example but not limited to three light-emitting dies 22*a*, 22*b* and 22*c*, the light-emitting dies are used for emitting the light of different color light, such as red light, green light and blue light; besides, the light-emitting dies 22*a*, 22*b* and 22*c* can be realized by but not limited to light-emitting diodes). The keycap 12 is disposed above the base plate 14. Both the first support 16 and the second support 18 are connected to and between the keycap 12 and the base plate 14 to support the keycap 12 so that the keycap 12 is movable in a vertical direction D1 (indicated by a double-headed arrow in FIG. 1 and FIG. 3) through the first support 16 and the second support 18. The switch circuit board 20 is placed on the base plate 14 (i.e. under the keycap 12). The light-emitting dies 22*a*, 22*b* and 22*c* are disposed under the switch circuit board 20, e.g., fixed on a light source circuit board 24 (the light source circuit board 24 is, for example, but not limited to a flexible printed circuit board) disposed under the base plate 14. The base plate 14 forms a corresponding through hole 142 to expose the light-emitting dies 22*a*, 22*b* and 22*c*; in practice, the light-emitting dies 22*a*, 22*b* and 22*c* can partially or fully enter the through hole 142. Please refer to FIG. 1 and FIG. 3. The light-emitting dies 22*a*, 22*b* and 22*c* are not higher than the base plate 14. The light-emitting dies 22*a*, 22*b* and 22*c* are located within a projection of the through hole 142 in the vertical direction D1. The circuitry of the switch circuit board 20 (parts of which are shown in dashed lines in FIG. 2) does not cover the light-emitting dies 22*a*, 22*b* and 22*c*, so that light emitted upward by the light-emitting dies 22*a*, 22*b* and 22*c* can pass through the switch circuit board 20 to illuminate the keycap 12.

In the embodiment, the switch circuit board 20 may be realized by a membrane circuit board, which is usually formed by stacking three layers of transparent sheets, in which the upper and lower transparent sheets form the required circuitry, and the middle transparent sheet provides the insulation for the circuitry. The circuitry of the switch circuit board 20 includes switch contact pads 202 and several trace segments (the hidden profiles of which are shown in dotted lines in FIG. 2). The illuminated keyswitch structure 1 uses a preamble resilient dome 26 as a returning part. The resilient dome 26 aligns with the switch contact pads 202. The resilient dome 26 is disposed on the switch circuit board 20 and covers the switch contact pads 202 and the light-emitting dies 22*a*, 22*b* and 22*c* in the vertical direction D1. The keycap 12 can be pressed (e.g., by a finger of a user) to squeeze the resilient dome 26 downward, thereby triggering the switch contact pads 202. After the external force applied to the keycap 12 is removed (e.g., the user removes his finger from the keycap 12), the squeezed resilient dome 26 can be restored to push the keycap 12 upwards back to its original position.

Figure 4A:
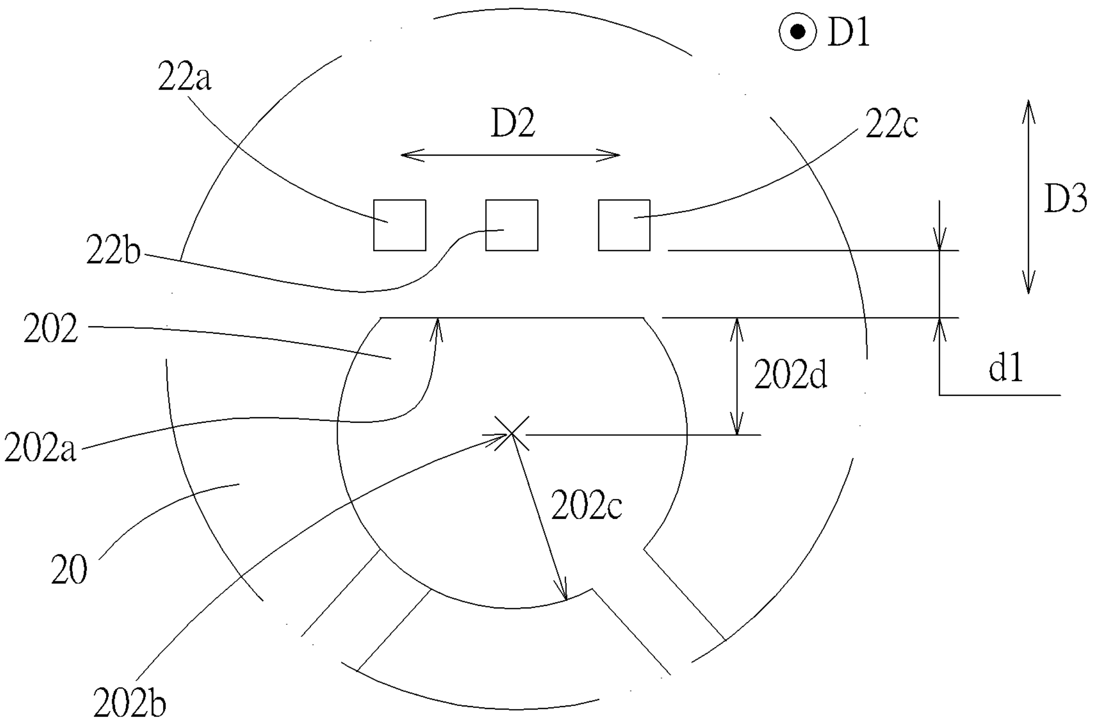
FIG. 4A is a schematic diagram illustrating a top view configuration of a switch circuit board and light-emitting dies.

Please also refer to FIG. 4A. FIG. 4A is a schematic diagram illustrating a top view configuration of a portion of the switch circuit board and light-emitting dies of the illuminated keyswitch structure in FIG. 2. Therein, the circuitry of the switch circuit board 20 and the hidden profiles of the light-emitting dies 22*a*, 22*b* and 22*c* are shown in solid lines. The switch contact pad 202 has a non-circular profile, e.g., but not limited to, a cut-flat circular profile with a flat edge 202*a*. The light-emitting dies 22*a*, 22*b* and 22*c* are arranged in an arrangement direction D2 (indicated by a double-headed arrow in FIG. 4A). The arrangement direction D2 is parallel to the flat edge 202*a*. There is a light-emitting distance d1 in a horizontal direction D3 (indicated by a double-headed arrow in the figures) between the light-emitting dies 22*a*, 22*b* and 22*c* and the switch contact pad 202 (that is, the distance from the projection of the profiles of the light-emitting areas of the light-emitting dies 22*a*, 22*b* and 22*c* on the switch circuit board 20 to the flat edge 202*a*). In principle, the farther the light-emitting dies 22*a*, 22*b* and 22*c* are from the switch contact pads 202, the more the situation that the switch contact pads 202 shields the light emitted by the light-emitting dies 22*a*, 22*b* and 22*c* can be reduced. In practice, the light-emitting distance d1 can be designed to be between 0.3 mm and 0.5 mm. Furthermore, in the embodiment, the cut-flat circular profile has a center 202*b* and a radius 202*c*. A ratio of A distance 202*d* from the center 202*b* to the flat edge 202*a* to the radius 202*c* is greater than 0.5. In principle, the switch contact pads 202 can maintain acceptable contact conduction characteristics.

Figure 4B:
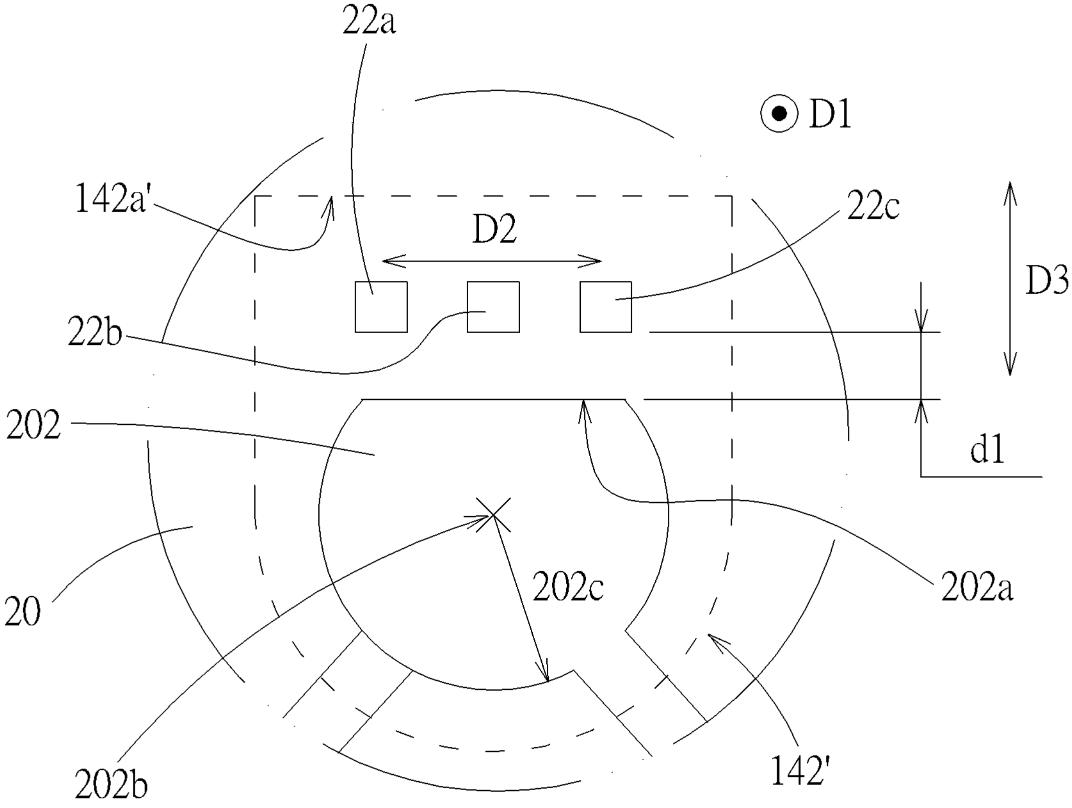
FIG. 4B is a schematic diagram illustrating a top view configuration of another embodiment extending form FIG. 4A.
Figure 4C:
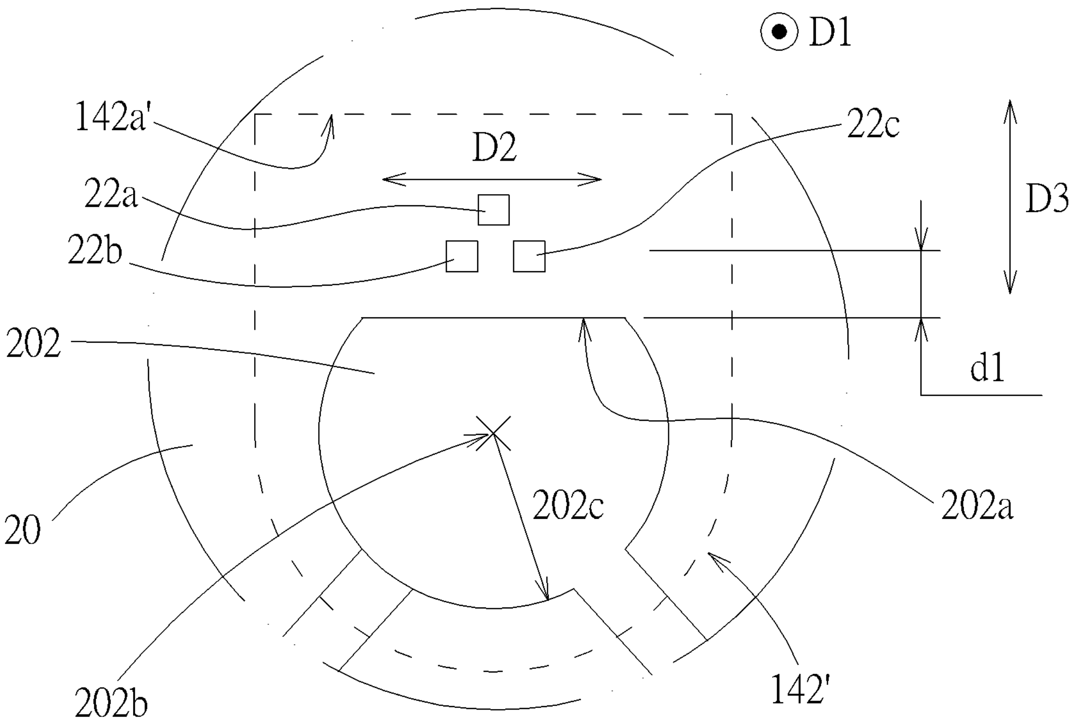
FIG. 4C is a schematic diagram illustrating a top view configuration of another embodiment extending form FIG. 4A.

Please refer to FIG. 4B and FIG. 4C. Each of FIG. 4B and FIG. 4C is a schematic diagrams illustrating a top view configuration of another embodiment extending form FIG. 4A. A portion of the arc edge of the through hole 142' of the base plate 14 (whose profile projection is shown in dashed lines in the figures) is parallel to the arc edge of the switch contact pad 202, and the other side of the through hole 142' consists of three mutually perpendicular edges, which form a bullet-shaped through hole 142' as a whole. In FIG. 4B, the light-emitting dies 22*a*, 22*b* and 22*c* are all arranged in the arrangement direction D2. The light-emitting dies 22*a*, 22*b* and 22*c* are not only adjacent to the flat edge 202*a* of the switch contact pad 202, but also adjacent to the straight hole edge 142*a*' of the through hole 142' of the base plate 14. In this case, the suitable configuration is that the arrangement direction D2 for the light-emitting dies 22*a*, 22*b* and 22*c* is parallel (or roughly parallel) to the hole edge 142*a*' of the through hole 142' of the base plate 14, and also parallel (or roughly parallel) to the flat edge 202*a* of the switch contact pad 202. In FIG. 4C, the light-emitting dies 22*a*, 22*b* and 22*c* are arranged in a triangle. The light-emitting die 22*a* is toward the straight hole edge 142*a*' of the through hole 142' of the base plate 14. The light-emitting die 22*c* is not located within a union range of the light-emitting dies 22*a* and 22*b*. The light-emitting dies 22*b* and 22*c* are arranged in a straight line in the arrangement direction D2 with edges parallel to each other. In this case, the arrangement direction of the at least two light-emitting dies 22*b* and 22*c* is parallel (or roughly parallel) to the straight hole edge 142*a*' of the through hole 142' of the base plate 14, and also parallel (or roughly parallel) to the flat edge 202*a* of the switch contact pad 202. However, it is not limited thereto in practice. For example, at least two light-emitting dies 22*b* and 22*c* may be arranged in the horizontal direction D3, so that the arrangement direction of the at least two light-emitting dies 22*b* and 22*c* is perpendicular (or roughly perpendicular) to the straight hole edge 142*a*' of the through hole 142' of the base plate 14, and also perpendicular (or roughly perpendicular) to the flat edge 202*a* of the switch contact pad 202, but parallel to the horizontal direction D3. In another embodiment, in the bullet-shaped through hole 142' of the base plate 14 in FIG. 4B and FIG. 4C, the three mutually perpendicular edges can be reduced as needed, and become a key-shaped through hole 142' with an arc end portion and a narrow and long end portion. In this case, all or at least two of the light-emitting dies 22*a*, 22*b* and 22 may be arranged in a straight line perpendicular to the flat edge 202*a* of the switch contact pad 202 and the hole edge 142*a*' at the end.

The hole edge 142*a*' of the through hole 142' of the base plate 14 and the flat edge 202*a* of the switch contact pad 202 are both heterochromatic sensitive areas. The heterochromatic sensitive area will cause the problem of uneven light mixing and color deviation. Therefore, the above technical solutions all are to dispose the plurality of light-emitting dies 22*a*, 22*b* and 22*c* at the same side of the heterochromatic sensitive area; that is, the light-emitting dies 22*a*, 22*b* and 22*c* are simultaneously disposed at the same side of the hole edge 142*a*' of the through hole 142' of the base plate 14, and/or the light-emitting dies 22*a*, 22*b* and 22*c* are simultaneously disposed at the same side of the flat edge 202*a* of the switch contact pad 202. The distances from the plurality of light-emitting dies 22*a*, 22*b* and 22*c* to the same heterochromatic sensitive area are close to each other. Since the process technology for the light-emitting dies 22*a*, 22*b* and 22*c* has reached the millimeter or even micron level, even if the light-emitting dies 22*a*, 22*b* and 22*c* are not arranged in a straight line, the distances to the same heterochromatic sensitive area are very close to each other. For clear display, the plurality of light-emitting dies in each figure of the present invention are drawn in a larger size, and the distances between the plurality of light-emitting dies are relatively large. In actual implementation, the scale of the light-emitting dies is much smaller than that in the figures of the invention.

Figure 5:
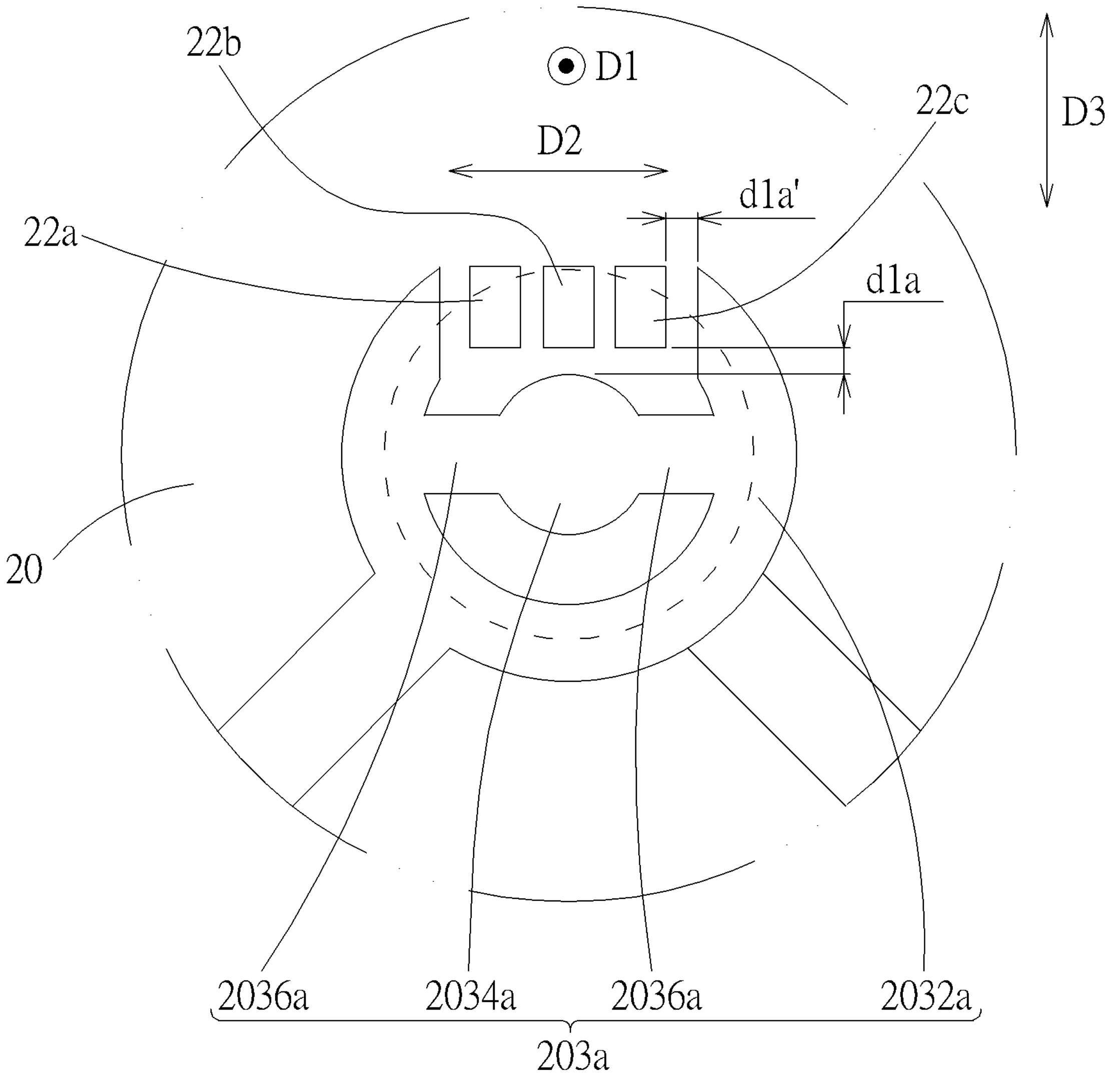
FIG. 5 is a schematic diagram illustrating a top view configuration of the switch circuit board and light-emitting dies in FIG. 4A according to another embodiment.

In addition, in practice, the switch contact pad of the switch circuit board 20 may have different shapes. For example, as shown by FIG. 5, the switch contact pad 203*a* according to an embodiment includes a peripheral portion 2032*a* and a central portion 2034*a* and two connecting portions 2036*a* which are located at the inner side the peripheral portion 2032*a*. The two connecting portions 2036*a* are located at opposite sides of the central portion 2034*a* and connect the peripheral portion 2032*a* and the central portion 2034*a*. The peripheral portion 2032*a* extends incompletely along a circular path (indicated by a dashed line in the figure) and is C-shaped. The central portion 2034*a* has a circular profile. The light-emitting dies 22*a*, 22*b* and 22*c* are located between two ends of the peripheral portion 2032*a* (i.e., at the opening). The circular path passes through the light-emitting dies 22*a*, 22*b* and 22*c* (i.e., the light-emitting dies 22*a*, 22*b* and 22*c* are arranged on the circular path). The light-emitting dies 22*a*, 22*b* and 22*c* are closer to the central portion 2034*a* and there is a light-emitting distance d1*a* between the light-emitting dies 22*a*, 22*b* and 22*c* and the central portion 2034*a*. Similarly, in practice, the light-emitting distance d1*a* can be designed to be between 0.3 mm and 0.5 mm. If the light-emitting dies 22*a*, 22*b* and 22*c* are closer to the two ends of the peripheral portion 2032*a* and there is a between the light-emitting dies 22*a*, 22*b* and 22*c* and the peripheral portion 2032*a*. Similarly, in practice, the light-emitting distance d1*a*' can also be designed to be between 0.3 mm and 0.5 mm.

Figure 6:
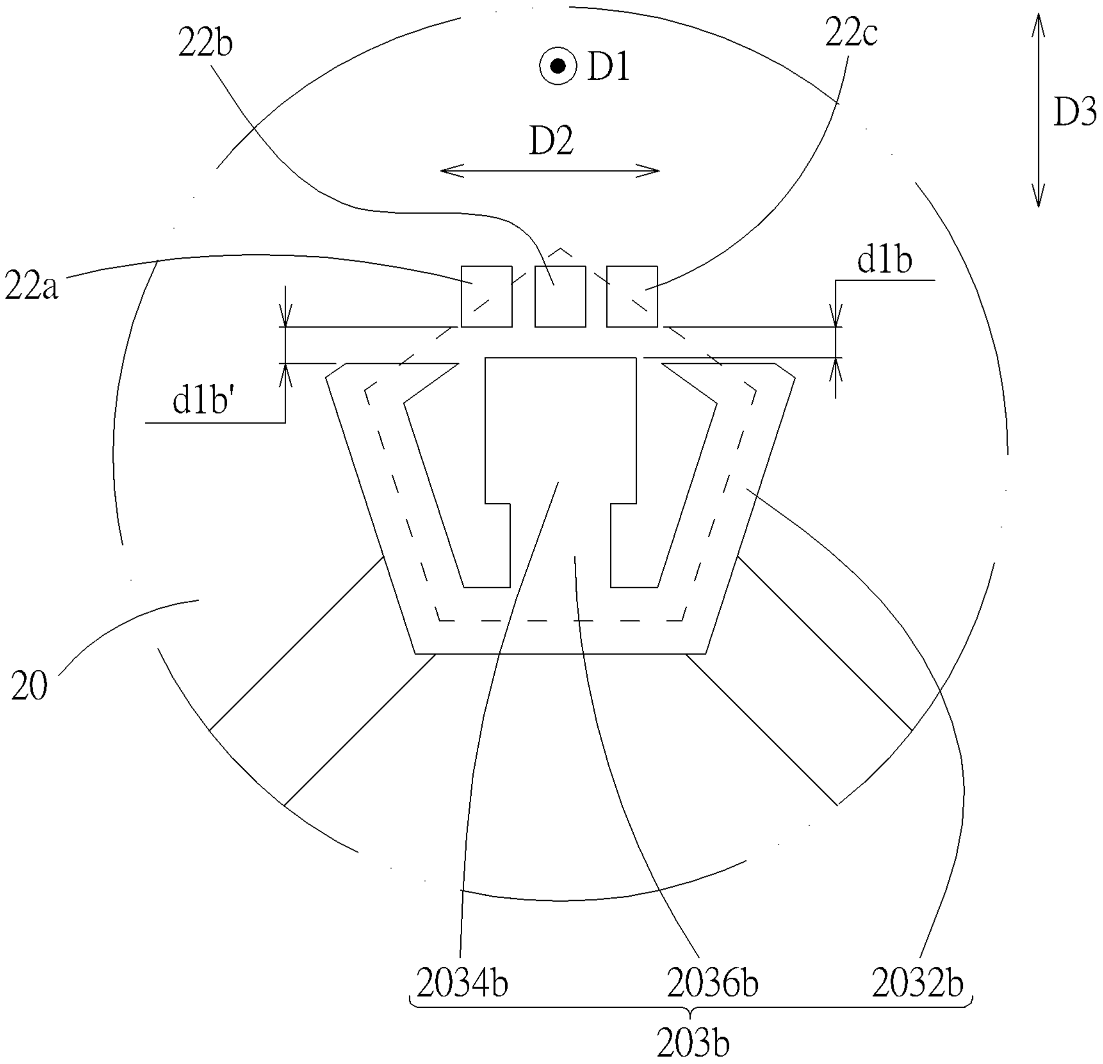
FIG. 6 is a schematic diagram illustrating a top view configuration of the switch circuit board and light-emitting dies in FIG. 4A according to another embodiment.

For another example, as shown by FIG. 6, the switch contact pad 203*b* according to an embodiment includes a peripheral portion 2032*b* and a central portion 2034*b* and a connecting portion 2036*b* which are located at the inner side the peripheral portion 2032*b*. The connecting portion 2036*b* connects the peripheral portion 2032*b* and the central portion 2034*b*. The peripheral portion 2032*b* extends incompletely along a convex polygonal path (e.g., but not limited to a pentagonal path, indicated by dashed lines in the figure) and is roughly C-shaped. The central portion 2034*b* has a convex polygonal profile (e.g., but not limited to a quadrilateral). The convex polygonal path passes through the light-emitting dies 22*a*, 22*b* and 22*c*. The light-emitting dies 22*a*, 22*b* and 22*c* are closer to the central portion 2034*b* and there is a light-emitting distance d1*b* between the light-emitting dies 22*a*, 22*b* and 22*c* and the central portion 2034*b*. Similarly, in practice, the light-emitting distance d1*b* can be designed to be between 0.3 mm and 0.5 mm. If the light-emitting dies 22*a*, 22*b* and 22*c* are closer to the peripheral portion 2032*b* and there is a light-emitting distance d1*b*' between the light-emitting dies 22*a*, 22*b* and 22*c* and the peripheral portion 2032*b*. Similarly, in practice, the light-emitting distance d1*b*' can also be designed to be between 0.3 mm and 0.5 mm. Furthermore, in FIG. 5 and FIG. 6, the convex polygonal path can also be a triangular path, a hexagonal path, etc. in practice. The profiles of the central portions 2034*a* and 2034*b* can also be other convex polygonal profiles, e.g. a triangular profile, a hexagonal profile, etc.

Please refer to FIG. 1 to FIG. 3. In the embodiment, the keycap 12 has a permeable indicator area 12*a* (shown by a dashed frame in the figures). Light emitted by the light-emitting dies 22*a*, 22*b* and 22*c* can pass through the permeable indicator area 12*a* to produce a visual indication effect. In practice, the permeable indicator area 12*a* may be numbers, symbols, letters, character s, graphics or combinations thereof, etc.; in other words, the permeable indicator area 12*a* may contain a plurality of permeable characters, and the permeable characters may be numbers, symbols, letters, characters, graphics or combinations thereof; in other words, the permeable indicator area 12*a* may include a plurality of permeable characters, and the permeable character may be number, symbol, letter, character or graphic.

Figure 7:
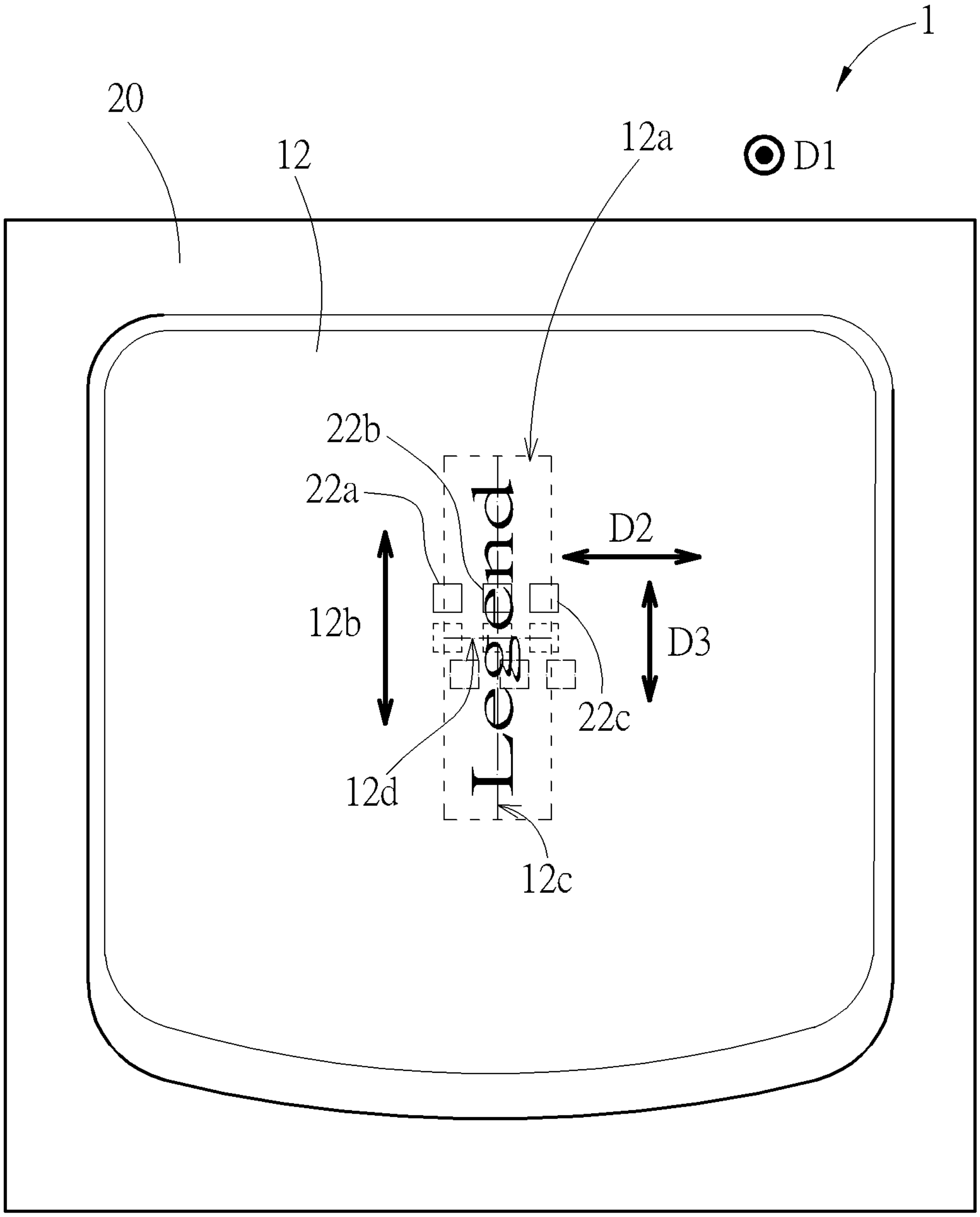
FIG. 7 is a top view of the illuminated keyswitch structure in FIG. 1.

Please also refer to FIG. 7 (in which the hidden profiles of the light-emitting dies 22*a*, 22*b* and 22*c* are shown in thin lines). FIG. 7 is a top view of the illuminated keyswitch structure in FIG. 1. In the embodiment, the permeable indicator area 12*a* has a lengthwise direction 12*b* (e.g. the arrangement direction of the letters in the figure, indicated by a double-headed arrow in FIG. 7). The light-emitting dies 22*a*, 22*b* and 22*c* are arranged under the permeable indicator area 12*a* perpendicular to the lengthwise direction 12*b* (that is, the arrangement direction D2 is perpendicular to the lengthwise direction 12*b*), thereby reducing or eliminating the influence of uneven light mixing on the permeable indicator area 12*a* caused by excessive arrangement spacing of the light-emitting dies 22*a*, 22*b*, and 22*c*. In other words, the two ends of the permeable indicator area 12*a* (and the permeable indicator area 12*a*' of the following embodiment) are heterochromatic sensitive areas, which are prone to uneven light mixing which causes color deviation of the light when exiting from the keycap 12. The permeable indicator area 12*a* may include a plurality of permeable characters. The plurality of permeable characters are arranged along a long axis. The so-called heterochromatic sensitive area is the end character on both sides of the plurality of permeable characters.

Furthermore, in the embodiment, the permeable indicator area 12*a* is rectangular, on which a long axis 12*c* and a short axis 12*d* are defined (both are shown in dashed lines in FIG. 7). The long axis 12*c* is parallel to the lengthwise direction 12*b*. The short axis 12*d* is perpendicular to the lengthwise direction 12*b*. The permeable indicator area 12*a* is symmetrical with respect to the long axis 12*c* and the short axis 12*d* respectively. In terms of vertical projection, the light-emitting dies 22*a*, 22*b* and 22*c* as a whole (that is, the plurality of light-emitting dies are regarded as a whole, the same below) pass through the long axis 12*c* and the center of the light-emitting dies 22*a*, 22*b*, 22*c* as a whole (i.e. the light-emitting die 22*b* In this embodiment) is located on the long axis 12*c*. In practice, the light-emitting dies 22*a*, 22*b* and 22*c* as a whole can also be designed to pass through the center of the long axis 12*c*, as shown by the rectangles in dashed lines in FIG. 7. In this case, the light-emitting dies 22*a*, 22*b* and 22*c* as a whole also pass through the center of the short axis 12*d*. The center of the light-emitting dies 22*a*, 22*b* and 22*c* as a whole (i.e. the light-emitting die 22*b* in this embodiment) is also located at the centers of the long axis 12*c* and the short axis 12*d*; however, it is not limited thereto. For example, the light-emitting dies 22*a*, 22*b* and 22*c* are offset parallel to the short axis 12*d*, so that the center of the light-emitting dies 22*a*, 22*b* and 22*c* as a whole deviates from the centers of the long axis 12*c* and the short axis 12*d* (for example, the light-emitting die 22*a* or 22*c* is located at the centers of long axis 12*c* and short axis 12*d*; for another example, light-emitting dies 22*a*, 22*b* and 22*c* are not located at the centers of long axis 12*c* and short axis 12*d*, as shown by rectangles in dashed lines in FIG. 7). In addition, in the illuminated keyswitch structure 1, although the light-emitting dies 22*a*, 22*b* and 22*c* are arranged in a straight line, they can also be arranged in a non-linear arrangement in practice, e.g. in a triangular arrangement. In this case, when the light-emitting dies 22*a*, 22*b* and 22*c* can be close enough to each other (which can be obtained through the actual test of the product), the influence of uneven light mixing on the permeable indicator area 12*a* caused by excessive arrangement spacing of the light-emitting dies 22*a*, 22*b*, and 22*c* can also be reduced or eliminated. The technical solutions in this embodiment are to dispose the plurality of light-emitting dies 22*a*, 22*b* and 22*c* at the same side of the heterochromatic sensitive area; that is, the light-emitting dies 22*a*, 22*b* and 22*c* are simultaneously disposed at the same side of the end character of the plurality of permeable characters. For the end character "L", the light-emitting dies 22*a*, 22*b* and 22*c* are simultaneously arranged at the same side of the end character "L"; for the end character "d" on the other side, the plurality of light-emitting dies 22*a*, 22*b* and 22*c* are simultaneously arranged at the same side of the end character "d". As far as the end character "L" regarded as a heterochromatic sensitive area is concerned, the arrangement direction of the light-emitting dies 22*a*, 22*b* and 22*c* is at least partially perpendicular to the permeable indicator area 12*a*, so that the distances to the same heterochromatic sensitive area (the end character "L") are close to each other, which can reduce the color deviation. Similarly, as far as the end character "d" regarded as a heterochromatic sensitive area is concerned, the arrangement direction of the light-emitting dies 22*a*, 22*b* and 22*c* is at least partially perpendicular to the permeable indicator area 12*a*, so that the distances to the same heterochromatic sensitive area (the end character "d") are close to each other, which can also reduce the color deviation.

In the present invention, a coverage space of the keycap 12 in the vertical direction D1 has a heterochromatic sensitive area. The heterochromatic sensitive area is, for example, an end of the permeable indicator area 12*a* of the keycap 12. The plurality of light-emitting dies 22*a*, 22*b* and 22*c* are located at the same side of the projection of the heterochromatic sensitive area (the end of the permeable indicator area 12*a*) in the vertical direction D1. Because the distances from the plurality of light-emitting dies 22*a*, 22*b* and 22*c* to the end of the permeable indicator area 12*a* are close to each other, the light of different colors emitted by the plurality of light-emitting dies 22*a*, 22*b* and 22*c* can travel to the end of the permeable indicator area 12*a* at similar distances, which can suppress the influence of uneven light mixing and color deviation.

In the illuminated keyswitch structure 1, the switch contact pads 202 are approximately located in the central area, but it is not limited to this in practice. For example, the switch contact pads 202 are offset from the center area and are triggered by the keycap 12 (e.g. by a downwardly protruding structure) or the support (the first support 16 or the second support 18). In this case, the light-emitting dies 22*a*, 22*b* and 22*c* can be kept far below the resilient dome 26, so that the light emitted by the light-emitting dies 22*a*, 22*b* and 22*c* does not need to pass through the resilient dome 26, reducing light intensity attenuation. Furthermore, the circuitry of the switch circuit board 20 generally refers to a collection of a plurality of traces and a plurality of circuit elements (e.g., the switch contact pads 202 mentioned above), which are the objects that the light-emitting dies 22*a*, 22*b* and 22*c* need to avoid. In detail, in illuminated keyswitch structure 1, the light-emitting dies 22*a*, 22*b* and 22*c* are closer to the switch contact pads 202 than other parts of the circuitry. However, in practice, the light-emitting dies 22*a*, 22*b* and 22*c* may also be closer to other parts of the circuitry than the switch contact pads 202.

Figure 8:
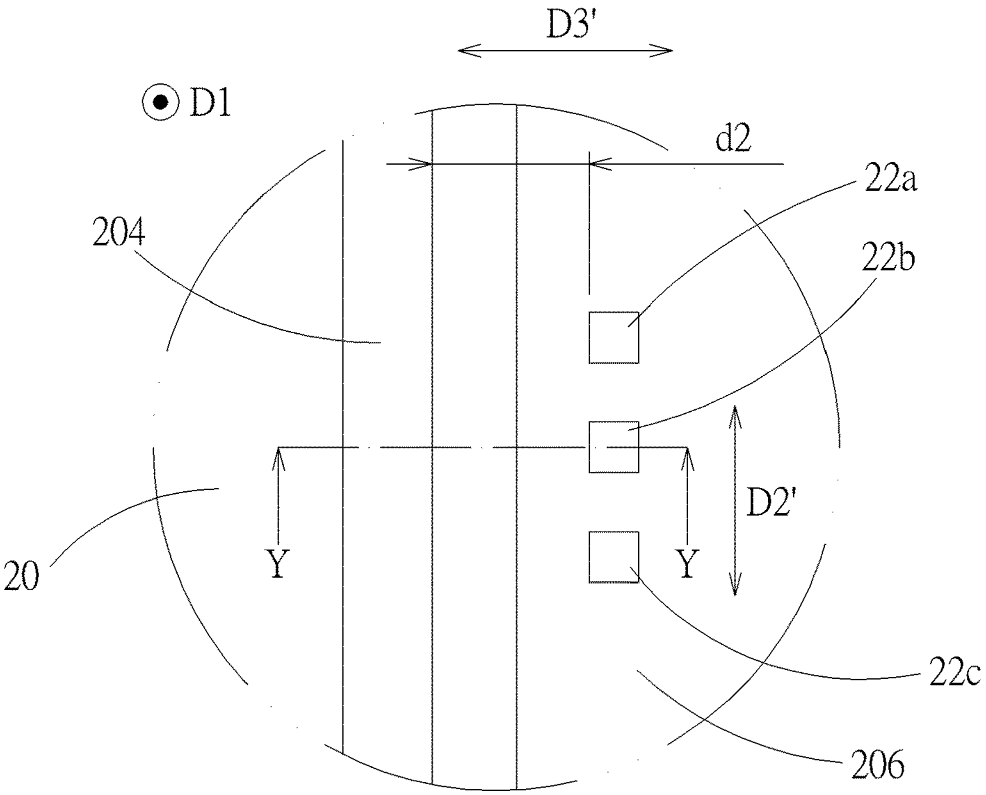
FIG. 8 is a schematic diagram illustrating a top view configuration of a portion of the switch circuit board and light-emitting dies according to another embodiment.

For example, in another embodiment, as shown by FIG. 8 (in which the hidden profile of the circuitry of the switch circuit board 20 is shown in thin lines), the light-emitting dies 22*a*, 22*b* and 22*c* are disposed close to a trace segment 204. The trace segment 204 extends in a straight line. The arrangement direction D2' of the light-emitting dies 22*a*, 22*b* and 22*c* is parallel to the trace segment 204. There is a light-emitting distance d2 (i.e. the distance from the projection of the profiles of the light-emitting areas of the light-emitting dies 22*a*, 22*b* and 22*c* on the switch circuit board 20 to the trace segment 204) in the horizontal direction D3' between the light-emitting dies 22*a*, 22*b* and 22*c* and the trace segment 204. In practice, the light-emitting distance d2 can also be designed to be between 0.3 mm and 0.5 mm.

In practice, the switch circuit board 20 may also be arranged under the base plate 14 as required. In this case, the switch circuit board 20 is closer to the lowermost light-emitting die 22*a*, 22*b* and 22*c* and covers a larger light-emitting range, and it is necessary to be farther away from the circuitry of the switch circuit board 20 to a greater extent. For circuit elements (e.g. the switch contact pads 202) or traces (e.g. the trace segment 204) that make up the circuitry, proper values for the light-emitting distances d1 and d2 may exceed the above-mentioned higher boundary value by 0.5 mm. In some practicable examples, the proper values for the light-emitting distances d1 and d2 are 0.59 mm, 0.66 mm and 0.78 mm. When the circuitry of the switch circuit board 20 is far away from the light-emitting dies 22*a*, 22*b* and 22*c*, e.g., using the base plate 14 with a larger thickness, or because of other structural parts that are added due to the illuminated keyswitch structure 1 (e.g. a movable plate, a magnetic, protrusions, etc. that are used for magnetic restoration or keyboard sinking), the proper values for the light-emitting distances d1 and d2 may be less than the lower boundary value. For example, in some practicable examples, the proper values for the light-emitting distances d1 and d2 are 0.27 mm, 0.23 mm and 0.17 mm. Therefore, according to the experimental data of different product models, the light-emitting distances d1 and d2 are preferably within the range from 0.17 mm to 0.78 mm.

Besides, the switch contact pads 202 may be printed on the upper and lower transparent sheets of the switch circuit board 20, respectively. The switch contact pads 202 on the upper and lower transparent sheets may have different patterns and outer diameters. The light-emitting dies 22*a*, 22*b* and 22*c* usually need to avoid the outermost edges of the switch contact pads 202 on the upper layer and lower layer of the switch circuit board 20; that is, the above light-emitting distance d1 have to be based on the overall outline of the switch contact pads 202 as a whole on the upper layer and lower layer.

Figure 9:
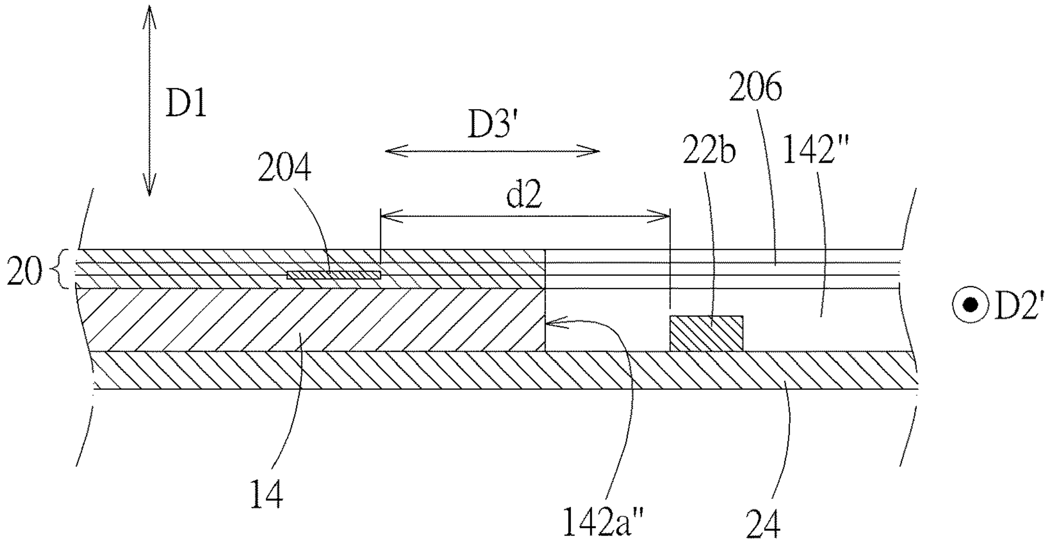
FIG. 9 is a sectional view along the line Y-Y corresponding to the embodiment FIG. 8.

Furthermore, please also refer to FIG. 8 and FIG. 9. FIG. 9 is a sectional view along the line Y-Y corresponding to the embodiment FIG. 8. In this embodiment, the switch circuit board 20 has a through hole 206. The light-emitting dies 22*a*, 22*b* and 22*c* are disposed opposite right to a through hole 142" of the base plate 14 and the through hole 206, so that light emitted upward by the light-emitting dies 22*a*, 22*b* and 22*c* can pass through the through hole 142" and the through hole 206 to illuminate the keycap 12, which can eliminate the intensity attenuation that occurs when the light passes through the physical structure of the switch circuit board 20. In the configuration shown by FIG. 4A, if the structural design allows, the switch circuit board 20 can also form through holes opposite right to the light-emitting dies 22*a*, 22*b* and 22*c* near the switch contact pads 202 to reduce the intensity attenuation of light.

In addition, in the embodiment, all the light-emitting dies 22*a*, 22*b* and 22*c* for providing the keycap 12 backlight are arranged in a straight line parallel to the flat edge 202*a*, but it is not limited thereto in practice. For example, the light-emitting dies 22*a*, 22*b* and 22*c* are arranged in other arrangements (e.g. arcs, triangles, polygons, arrays, etc.); therein, the distance in the horizontal direction D3 between the light-emitting die 22*a*, 22*b* or 22*c* closest to the switch contact pad 202 and the switch contact pad 202 is defined as the light-emitting distance. Similarly, the portion of the profile of the switch contact pad 202 close to the light-emitting dies 22*a*, 22*b* and 22*c* is not limited to a straight line. The trace segment 204 close to the light-emitting dies 22*a*, 22*b* and 22*c* is also not limited to a straight line. The closer the light-emitting dies 22*a*, 22*b* and 22*c* can be disposed to the circuitry, the more the range for the light-emitting dies 22*a*, 22*b* and 22*c* to dispose can be increased, that is, increasing the design flexibility of the permeable indicator area 12*a*.

Figure 10:
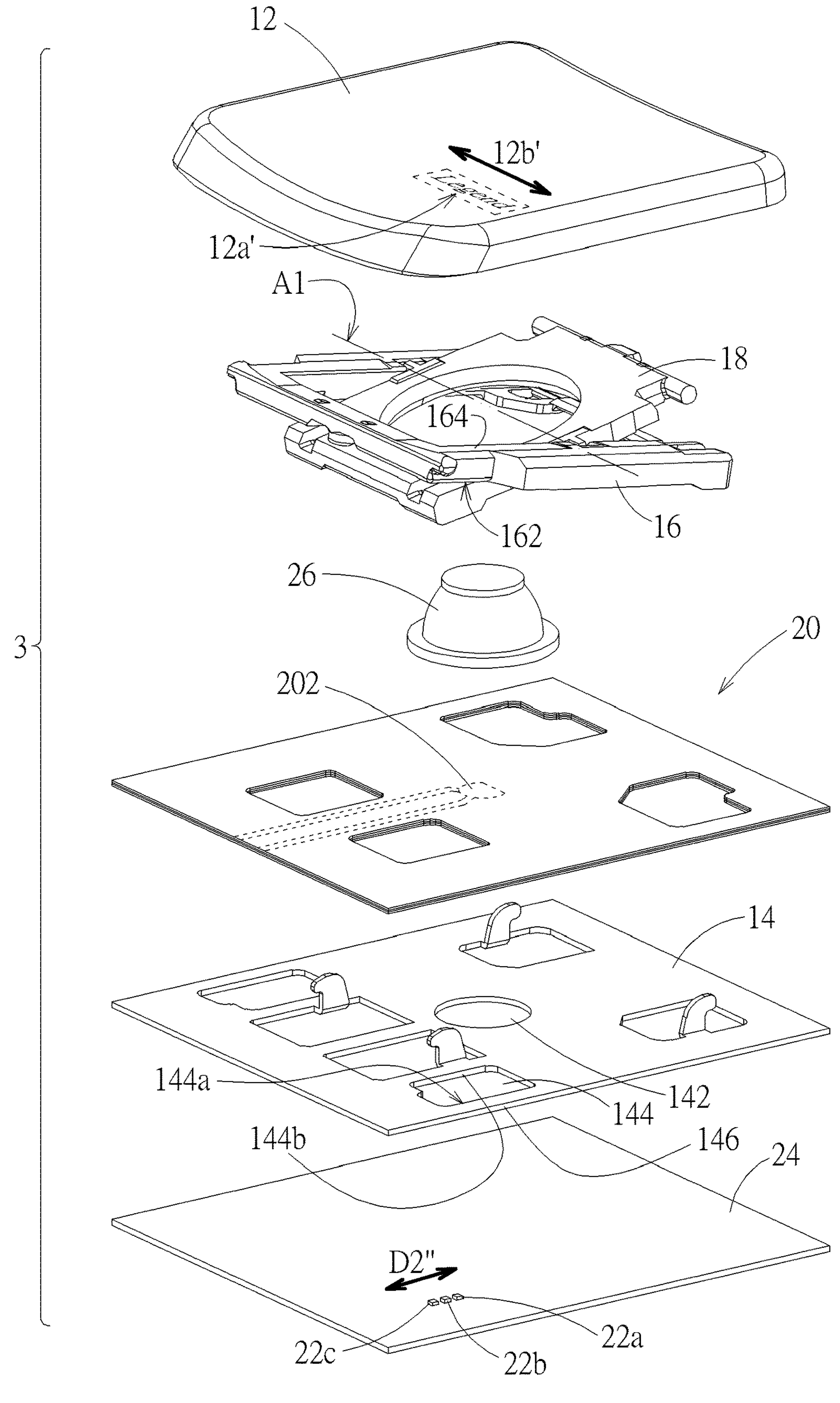
FIG. 10 is a schematic diagram illustrating an illuminated keyswitch structure according to another embodiment.
Figure 11A:
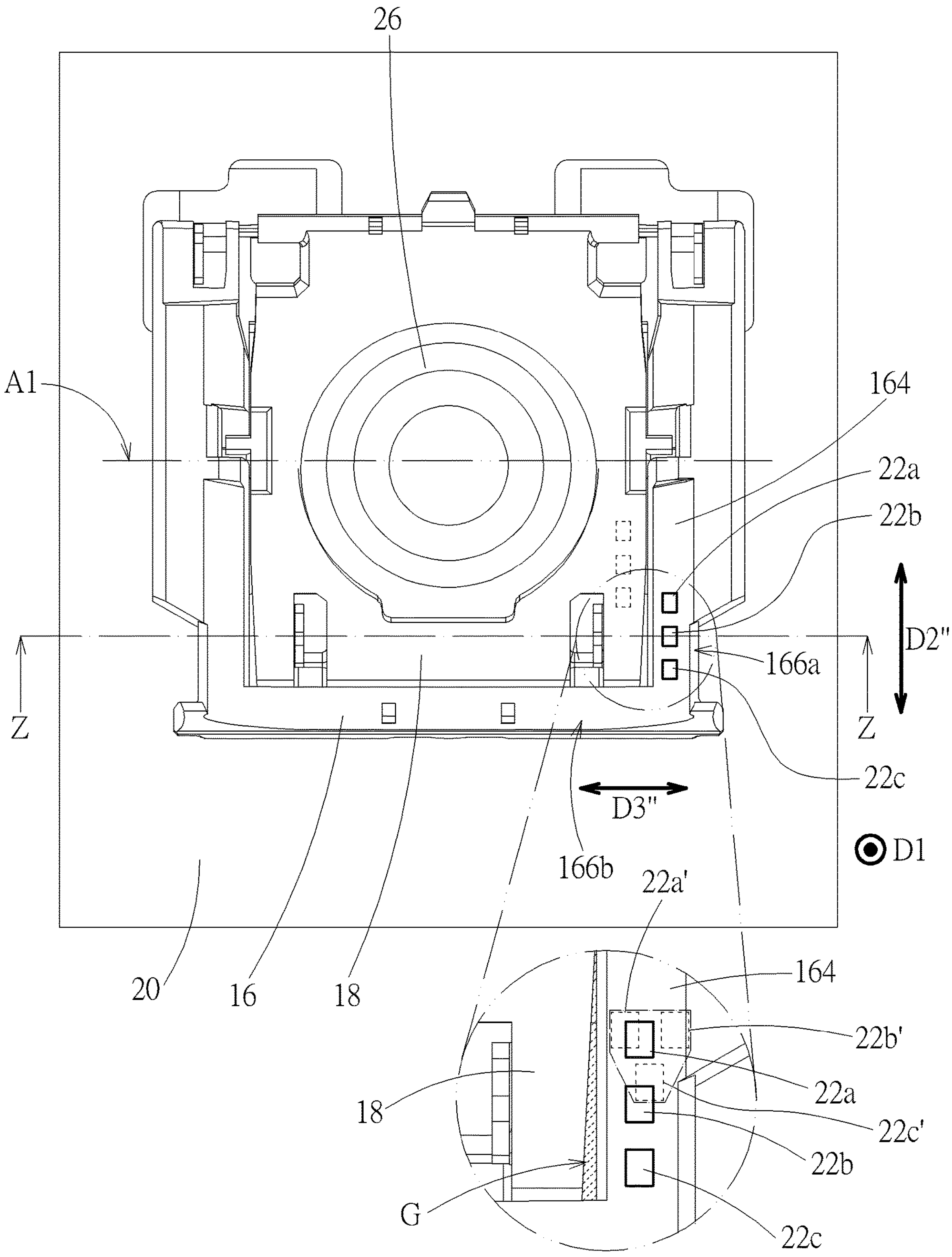
FIG. 11A is a top view of the illuminated keyswitch structure after the keycap is removed.

Please refer to FIG. 10 and FIG. 11A, which show an illuminated keyswitch structure 3 according to another embodiment. The illuminated keyswitch structure 3 is structurally similar to the illuminated keyswitch structure 1. The illuminated key switch structure 3 in principle follows the component symbols of the illuminated key switch structure 1. For other descriptions about the illuminated keyswitch structure 3, please refer to the relevant descriptions of the same named components and their variations in illuminated keyswitch structure 1 in the foregoing. In the illuminated keyswitch structure 3, the first support 16 and the second support 18 are disposed opposite to each other and are light permeable, and are connected together to the bottom side of the keycap 12 and the top side of the base plate 14.

When the keycap 12 is not pressed yet, the permeable first support 16 and the permeable second support 18 are an X-shaped scissors support in an extended state (as shown in FIG. 10 or refer to FIG. 3). In other words, light emitted by the light-emitting dies 22*a*, 22*b* and 22*c* disposed under the base plate 14 has different transmission paths and angles of incidence/reflection/refraction at different surface of different portions of sloping upper and lower halves and upper and lower ends of the first support 16 and the second support 18. The adjacent portions of the first support 16 and the second support 18 belong to the heterochromatic sensitive area, or the vertical space covering the gap projection G is the heterochromatic sensitive area, which is prone to uneven light mixing which causes color deviation of the light when exiting from the keycap 12. If a monochromatic light source is disposed within the gap projection G (represented by dashed hatching in FIG. 11A, that is, the projection of the gap between the first support 16 and the second support 18 in the vertical direction D1) of the first support 16 and the second support 18, the light will be directly or indirectly transmitted through different portions of the first support 16 and the second support 18 to illuminate the keycap 12, which will eventually cause serious uneven illumination. If light sources of different colors such as the light-emitting dies 22*a*, 22*b* and 22*c* are disposed in the gap projection G (or overlapping the gap projection G), color deviation will occur at different positions of the keycap 12 due to uneven light mixing.

Please refer to FIG. 10 and FIG. 11A. Therefore, in the embodiment, all the light-emitting dies 22*a*, 22*b* and 22*c* (whose hidden profile is shown in bold lines in FIG. 11A) for providing backlight are disposed under the first support 16 (that is, the light-emitting dies 22*a*, 22*b* and 22*c* are located within the projection of the first support 16 in the vertical direction D1) and located within the through hole 144 (or under the base plate opposite right to the through hole 144 of the base plate 14; that is, the light-emitting dies 22*a*, 22*b* and 22*c* are located within the projection of the through hole 144 in the vertical direction D1). The light emitted by the light-emitting dies 22*a*, 22*b* and 22*c* travels upward from the through hole 144 and passes through the first support 16 (or passes through the through hole 144 and the first support 16) to illuminate the keycap 12. Since the light emitted by the light-emitting dies 22*a*, 22*b* and 22*c* passes through the same support, in principle, the light is affected very similarly (e.g. intensity attenuation, divergence or deviation of travelling path, etc.), which can suppress the degree of color deviation of the light that may occur after the light passes through the structural parts. Furthermore, in the embodiment, the light emitted by the light-emitting dies 22*a*, 22*b* and 22*c* enters the first support 16 from the lower surface 162 of the first support 16 and exits out the first support 16 from the upper surface 164 of the first support 16. The lower surface 162 and the upper surface 164 are parallel. This structural configuration also helps to suppress the degree of color deviation of the light that may occur after the light passes through the structural parts. Similarly, in practice, the light-emitting dies 22*a*, 22*b* and 22*c* can also be changed to be disposed under the second support 18, as shown in dashed lines in FIG. 11A. In this way, as long as the gap projection G (i.e. the projection area of the gap between the first support 16 and the second support 18 in the vertical direction) of the first support 16 and the second support 18 does not overlap the light-emitting dies 22*a*, 22*b* and 22*c*, which can avoid color deviation. That the gap projection G of the first support 16 and the second support 18 does not overlap the light-emitting dies 22*a*, 22*b* and 22*c* not only means that the gap projection G does not directly overlap any one of the light-emitting dies 22*a*, 22*b* and 22*c* itself, but also contains the situation that the gap projection G does not pass through the gaps between any adjacent two of the light-emitting dies 22*a*/22*b* and 22*b*/22*c* (that is, the gap projection G does not overlap or pass through the whole light-emitting dies 22*a*, 22*b* and 22*c*). The light-emitting dies 22*a*, 22*b* and 22*c* as a whole can be logically represented by a single convex polygonal region that can cover all light-emitting dies 22*a*, 22*b* and 22*c*. For example, the light-emitting dies 22*a*, 22*b* and 22*c* are not arranged in a straight line (shown by dashed rectangles in the enlarged view in FIG. 11A), and the whole can be covered by a convex hexagonal region (shown by a dashed polygon in FIG. 11A, or in terms of lines connecting their centers, they are arranged in a triangle). On the premise that the gap projection G does not overlap or pass through the whole light-emitting dies 22*a*', 22*b*' and 22*c*', the arrangement of the light-emitting dies 22*a*', 22*b*' and 22*c*' and the gap projection G may also have a specific relative relationship. For example, at least two of the light-emitting dies 22*a*', 22*b*' and 22*c*' that are arranged in a triangle in FIG. 11A are arranged in the horizontal direction D3" (that is, at least two of the light-emitting dies 22*a*', 22*b*' and 22*c*' are arranged parallel to the horizontal direction D3") and perpendicular to the gap projection G (that is, the gap projection G extends roughly parallel to the arrangement direction D2").

Figure 11B:
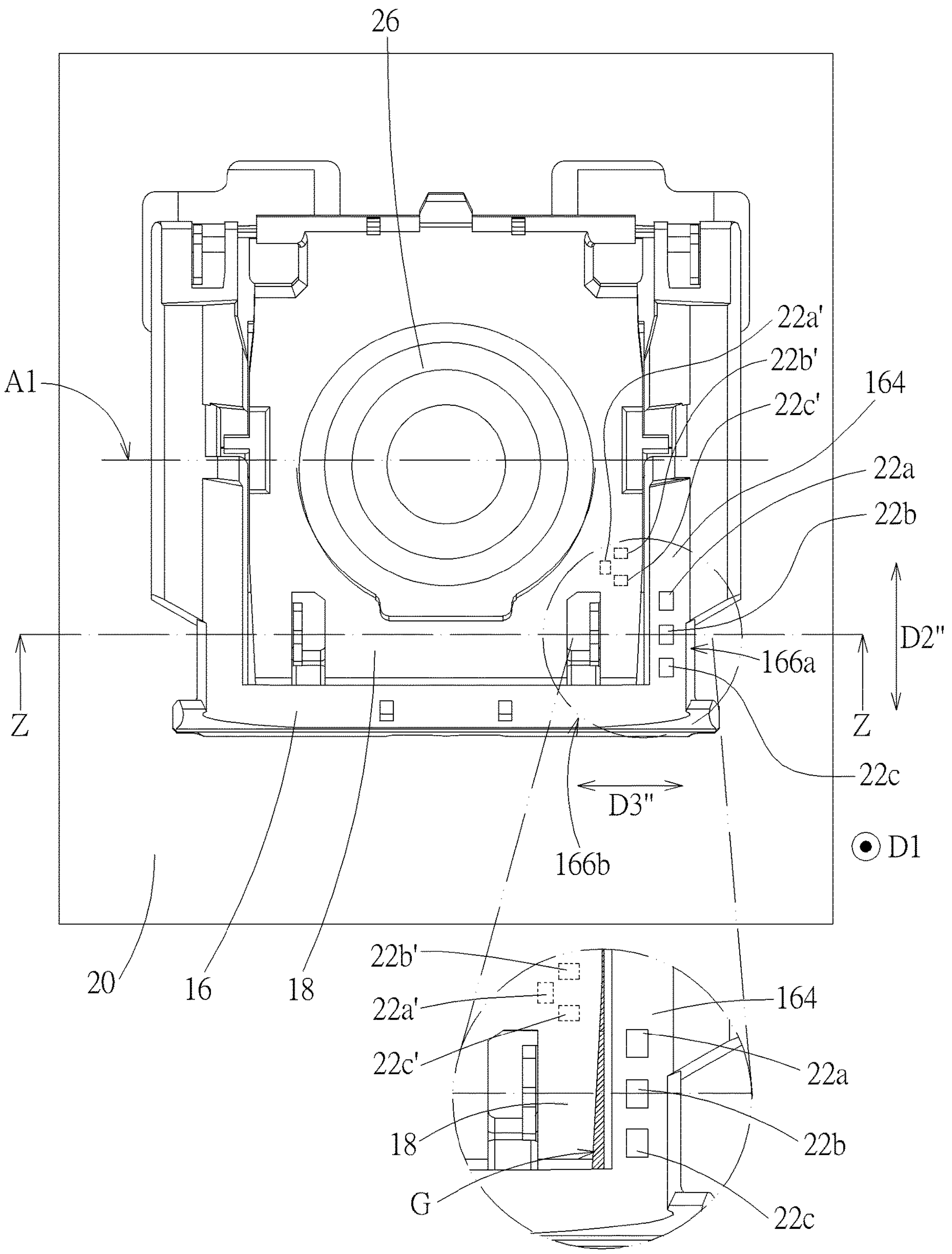
FIG. 11B is a schematic diagram illustrating a top view configuration of another embodiment extending form FIG. 11A.

Besides, as shown by the three light-emitting dies 22*a*', 22*b*' and 22*c*' which are shown in dashed lines in FIG. 11B and are arranged in a triangle at the second support 18, when the light-emitting dies 22*a*', 22*b*' and 22*c*' in dashed lines are arranged in a triangle (in terms of their central connections), the light emitting dies 22*b*' and 22*c*' are arranged in a straight line with edges parallel to each other (i.e. parallel to each other), and the light-emitting die 22*a*' is not located within the union range of the light-emitting dies 22*b*' and 22*c*' (e.g., the axes of the light-emitting die 22*b*' and the light-emitting die 22*c*' are a straight line, and the axis of the light-emitting die 22*a*' is not located on the straight line). In order to avoid local slight color deviation caused by at least two of the light-emitting dies 22*a*', 22*b*' and 22*c*' in dashed lines that are adjacent to the gap projection G between the adjacent portions of the first support 16 and the second support 18 at the same time, but have unequal distances to the gap projection G, the arrangement direction D2" of the at least two of the light-emitting dies 22*a*', 22*b*' and 22*c*' in dashed lines that are adjacent to the gap projection G can be parallel to the gap projection G and perpendicular to the horizontal direction D3". As for the third light-emitting dies 22*a*', 22*b*' or 22*c*' arranged in the triangle, it is roughly located on the line connecting the centers of the two light-emitting dies 22*a*', 22*b*' or 22*c*' in dashed lines. The third light-emitting dies 22*a*', 22*b*' or 22*c*' in dashed lines can be farther from the gap projection G, or can be closer to the gap projection G than the other two.

Furthermore, in the embodiment, the whole first support 16 shows a rectangular frame. The light-emitting dies 22*a*, 22*b* and 22*c* are located under a frame portion 166*a* of the rectangular frame. A projection of the frame portion 166*a* in the vertical direction D1 has a lengthwise direction (in the view point of FIG. 11A, the lengthwise direction is equivalent to the arrangement direction D2" of the light-emitting dies 22*a*, 22*b* and 22*c*). The lengthwise direction is parallel to the arrangement direction D2" of the light-emitting dies 22*a*, 22*b* and 22*c*. In practice, the light-emitting dies 22*a*, 22*b* and 22*c* can be located under a frame portion 166*b* of the rectangular frame. The light-emitting dies 22*a*, 22*b* and 22*c* are arranged parallel to the lengthwise direction (extension direction) of the frame portion 166*b*. Furthermore, the first support 16 may also be realized by frames in other geometric configurations, such as U-shaped (or n-shaped) frames.

To sum up, the above technical solutions in this embodiment are to dispose the light-emitting dies 22*a*, 22*b*, 22*c* and 22*a*', 22*b*' or 22*c*' at the same side of the heterochromatic sensitive area, i.e. the gap projection G. At the same time, for the light-emitting dies 22*a*, 22*b* and 22*c*, the distances to the same heterochromatic sensitive area (i.e. gap projection G) are close to each other. For the light-emitting die 22*a*', 22*b*' or 22*c*', the distances to the same heterochromatic sensitive area (i.e. gap projection G) are also close to each other. For example, the size of the keycap is in the order of cm, and the distances between the plurality of light-emitting dies are less than 1 mm. In this way, that the distances to the same heterochromatic sensitive area are close to each other means that the differences between the distances from each light-emitting die to the same heterochromatic sensitive area (gap projection G) are almost negligible (e.g., the differences between the distances from each light-emitting die to the same heterochromatic sensitive area are less than 1 mm). The color deviation caused by such a small distance difference is not discernible by the human eye.

In the present invention, the coverage space of the keycap 12 in the vertical direction D1 has a heterochromatic sensitive area. The heterochromatic sensitive area is, for example, the gap projection G between the keycap 12 the first support 16 and the second support 18. The plurality of light-emitting dies 22*a*, 22*b* and 22*c* as a whole do not overlap the gap projection G. Since the light of different colors emitted by the multiple light-emitting dies 22*a*, 22*b* and 22*c* can travel at similar distances, the influence of the gap projection G on uneven light mixing and color deviation can be suppressed.

Figure 12:
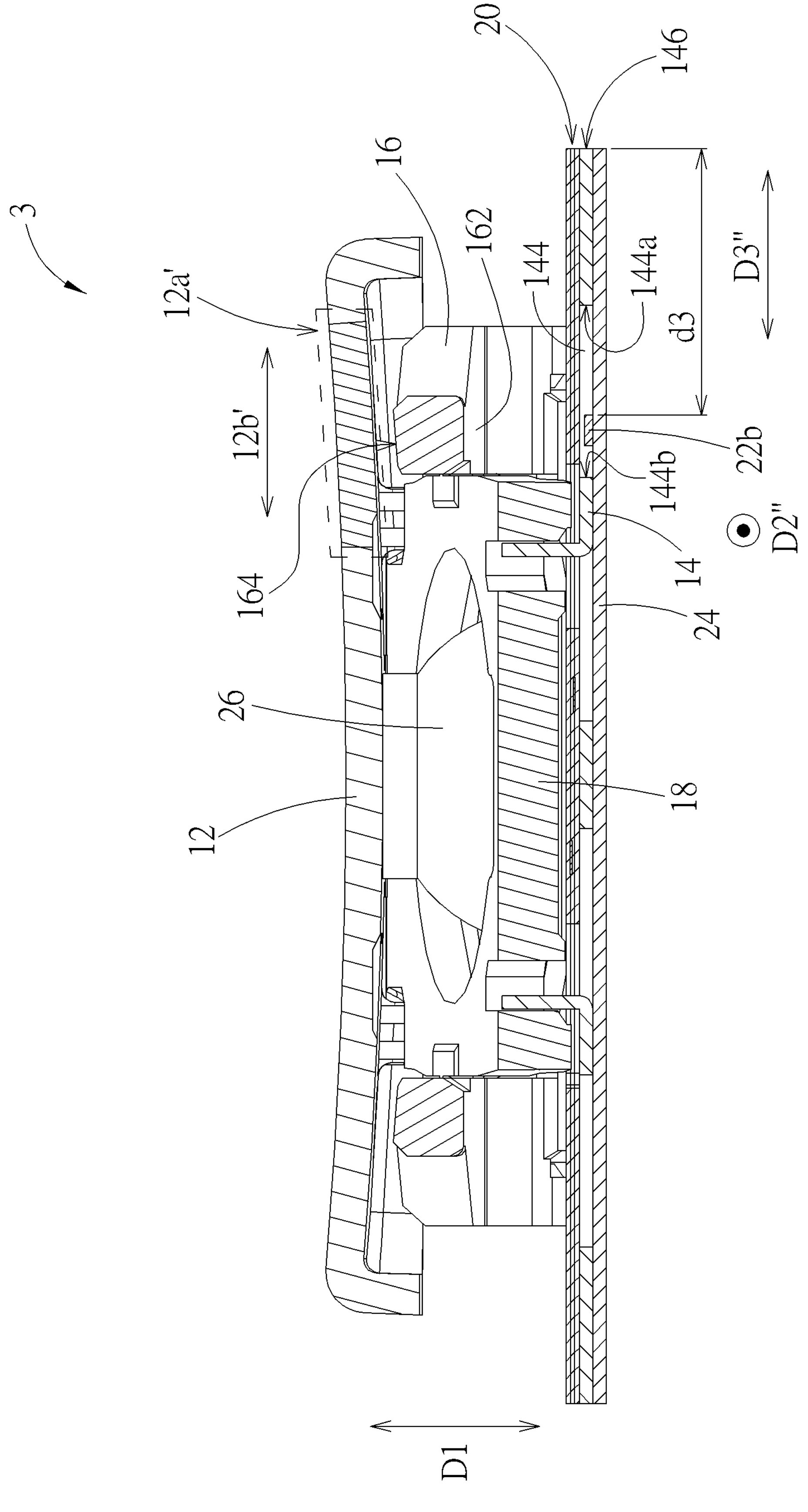
FIG. 12 is a sectional view along the line Z-Z in FIG. 11A.

Furthermore, please also refer to FIG. 10 and FIG. 12. In the embodiment, the base plate 14 has an outer plate edge 146 in the horizontal direction D3" that is closest to the light-emitting dies 22*a*, 22*b* and 22*c*. There is a light-emitting distance d3 between the light-emitting dies 22*a*, 22*b* and 22*c* and the outer plate edge 146. In principle, the farther the light-emitting dies 22*a*, 22*b* and 22*c* are from the outer plate edge, the more the base plate can restrain the light emitted by the light-emitting dies 22*a*, 22*b* and 22*c* from escaping from the outer plate edge 146. In practice, the proper values for the light-emitting distance d3 of multiple models are 4.8 mm, 5.3 mm, 6.2 mm, 7.1 mm and 7.7 mm. The light-emitting distance d3 is preferably within the range from 4.8 mm to 7.7 mm. Furthermore, in the embodiment, the arrangement direction D2" of the light-emitting dies 22*a*, 22*b* and 22*c* is parallel to the outer plate edge 146, but it is not limited thereto in practice.

Figure 13A:
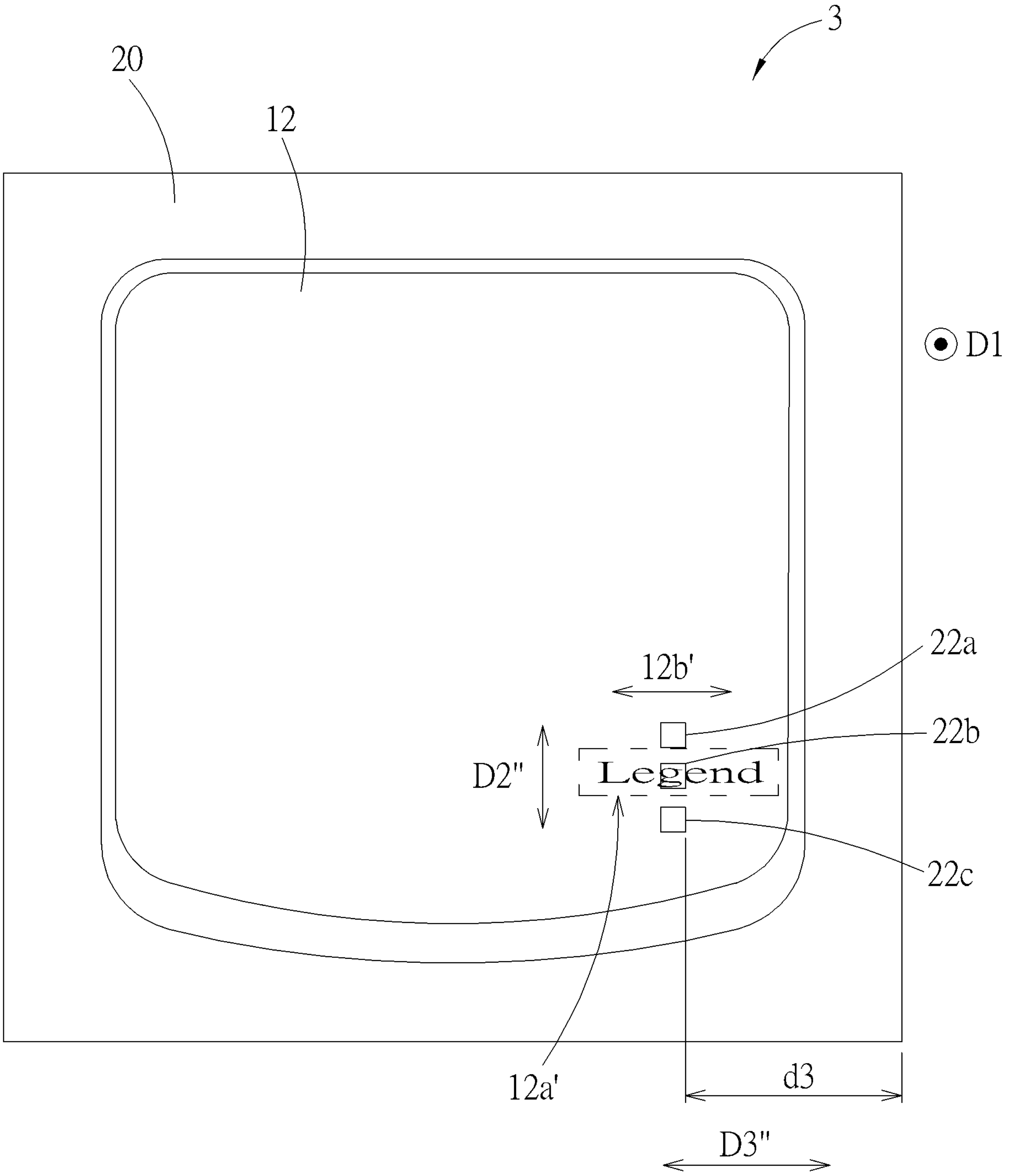
FIG. 13A is a top view of the illuminated keyswitch structure in FIG. 10.
Figure 13B:
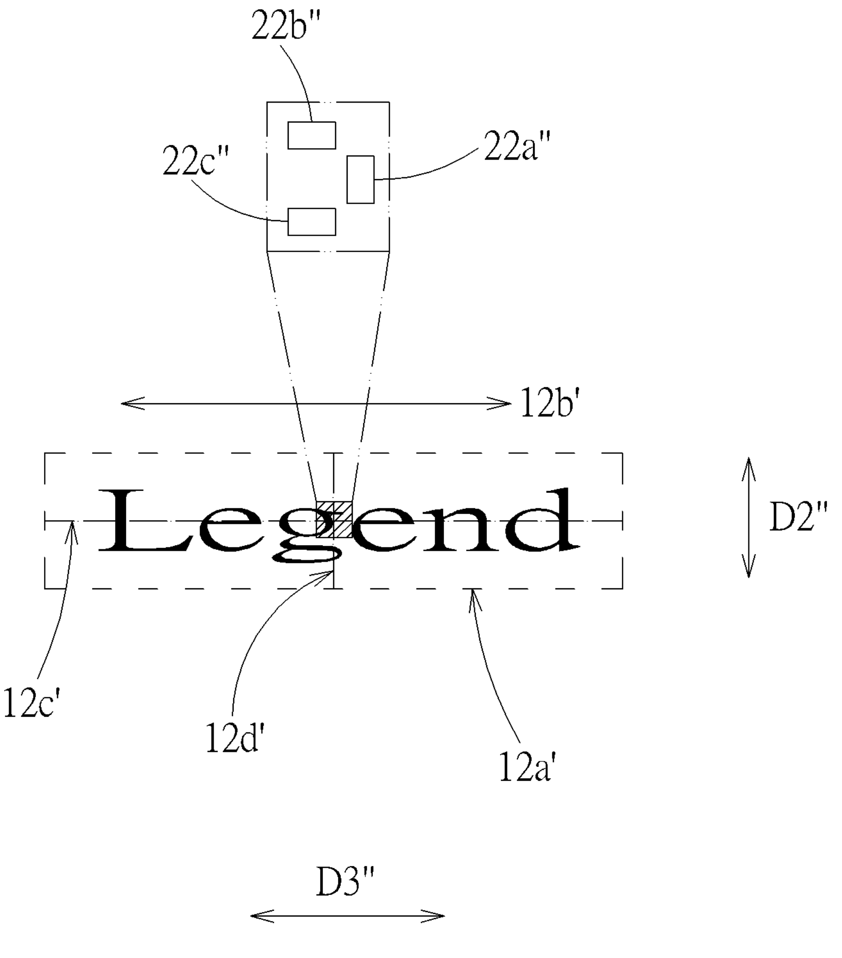
FIG. 13B is a top view of a portion of another embodiment extending form FIG. 13A.

Furthermore, please also refer to FIG. 13A. FIG. 13A is a top view of the illuminated keyswitch structure in FIG. 10, in which the hidden profiles of the light-emitting dies 22*a*, 22*b* and 22*c* are shown in thin lines. In general, the arrangement direction of monochromatic light sources does not need to consider the lengthwise direction 12*b*' of the permeable indicator area 12*a*' of the keycap 12. However, in the case of multi-color light sources, e.g. mixing light of three colors emitted by the light-emitting dies 22*a*, 22*b* and 22*c* into various colors that need to be presented, if the arrangement direction D2" of the light-emitting dies 22*a*, 22*b* and 22*c* is perpendicular to the lengthwise direction 12*b*' of the permeable indicator area 12*a*' of the keycap 12, the two light-emitting dies 22*a* and 22*c* on the outside provide the most sufficient light in the adjacent character section, but the character section far from the light-emitting dies 22*a* and 22*c* has the problem of insufficient light, which causes color deviation at two distal sections of the permeable indicator area 12*a*' in the lengthwise direction 12*b*'. Besides, FIG. 13B is a top view of a portion of another embodiment extending form FIG. 13A, in which the light-emitting dies 22*a*, 22*b* and 22*c* are arranged in a triangle (in terms of lines connecting their centers); that is, the long edge of the light-emitting die 22*b*" and the long edge of the light-emitting die 22*c*" are arranged perpendicular to the arrangement direction D2", and the light-emitting die 22*a*" is not located in the union range of the light-emitting dies 22*b*" and 22*c*". If necessary, the long edge of the light-emitting die 22*a*" is parallel to the short edges of the light-emitting dies 22*b*" and 22*c*", but the long edge of the light-emitting die 22*a*" is perpendicular to the long edges of the light-emitting dies 22*b*" and 22*c*". The arrangement direction D2" of at least two light-emitting dies 22*b*" and 22*c*" is perpendicular to the lengthwise direction 12*b*'/long axis direction 12*c*' of the permeable indicator area 12*a*', also perpendicular to the horizontal direction D3", and parallel to the short axis direction 12*d*'. The light-emitting dies 22*b*" and 22*c*" are located at the same side of the same heterochromatic sensitive area, i.e., the same side of the first permeable character "L" or second permeable character "d" of the end characters, and the distances to the same heterochromatic sensitive area, i.e., the end character "L" or "d" are already close to each other, so the color deviation can be eliminated. As for the third light-emitting die 22*a*', it is disposed preferably adjacent to the center line of the short axis 12*d*' of the permeable indicator area 12*a*'. In this case, there is no other light-emitting part under the permeable indicator area 12*a*', except for the first light-emitting die, the second light-emitting die and the third light-emitting dies 22*a*", 22*b*" and 22*c*". If necessary, the line connecting the first permeable character "L" and the second permeable character "d" passes through the union range of the light-emitting dies 22*a*", 22*b*" and 22*c*", or the line connecting the first permeable character "L" and the second permeable character "d" passes through the light-emitting die 22*a*", or the center of the union range of the light-emitting dies 22*a*", 22*b*" and 22*c*" is located at the center point of the long axis of the permeable indicator area 12*a*'. Overall, the light-emitting dies 22*a*", 22*b*" and 22*c*" are preferably adjacent to the geometric center of the permeable indicator area 12*a*'.

In the embodiment, in the keycap 12, the lengthwise direction 12*b*' of the permeable indicator area 12*a*' above the light-emitting dies 22*a*, 22*b* and 22*c* is perpendicular to the arrangement direction D2", thus reducing or eliminating the influence of uneven light mixing on the permeable indicator area 12*a*' caused by the spaced arrangement of the light-emitting dies 22*a*, 22*b* and 22*c*. In addition, for other descriptions about the relative position relationship between the light-emitting dies 22*a*, 22*b* and 22*c* and the permeable indicator area 12*a*', please refer to the relevant descriptions of the relative position relationship between the light-emitting dies 22*a*, 22*b* and 22*c* and the permeable indicator area 12*a* and variations thereof, which will not be repeated. In addition, in the embodiment, the through hole 144 is roughly rectangular. Hole edges 144*a* and 144*b* thereof are parallel to an edge of the permeable indicator area 12*a*'. The arrangement direction D2" of the light-emitting dies 22*a*, 22*b* and 22*c* is parallel to the hole edges 144*a* and 144*b* (equivalent to inner plate edges) of the through hole 144, as shown by FIG. 10 and FIG. 12. This configuration is conducive to reduction of the influence of the through hole 144 on the light field provided by the light-emitting dies 22*a*, 22*b* and 22*c* to the permeable indicator area 12*a*'. The description also applies to the arrangement of the light-emitting dies 22*a*, 22*b* and 22*c* relative to the through hole 142" in FIG. 8 and FIG. 9 (in which the light-emitting dies 22*a*, 22*b* and 22*c* are also disposed parallel to the hole edge 142*a*"). Furthermore, the arrangement parallel to the hole edge can also apply to the disposition of the light-emitting dies 22*a*, 22*b* and 22*c* in the illuminated keyswitch structure 1 relative to the through hole 142 (e.g., modified to be a rectangular hole), which will not be repeated.

In addition, in the illuminated keyswitch structure, in practice, the light-emitting dies 22*a*, 22*b* and 22*c* can also be modified to be arranged above the base plate 14, which can avoid the interference of the base plate 14 to the light emitted by the light-emitting dies 22*a*, 22*b* and 22*c*. In this case, the base plate 14 does not need to form a through hole corresponding to the light-emitting dies 22*a*, 22*b* and 22*c*, which is conducive to the strength of the base plate 14. Furthermore, the light-emitting dies 22*a*, 22*b* and 22*c* can be integrated into the circuitry of the switch circuit board 20. For example, the light-emitting dies 22*a*, 22*b* and 22*c* are disposed directly on the lower transparent sheet of the switch circuit board 20 and are powered by the circuitry on the lower transparent sheet. The middle and upper transparent sheets form openings correspondingly, so as to expose the light-emitting dies 22*a*, 22*b* and 22*c*. This structural configuration can eliminate the interference of the switch circuit board 20 to the light emitted by the light-emitting dies 22*a*, 22*b* and 22*c*.

Furthermore, in the illuminated keyswitch structures 1 and 3, the first support 16 and the second support 18 are pivotally connected with each other around the pivot axis A1 through their middle portions to form an X-shaped scissors support; however, it is not limited thereto in practice. For example, the first support 16 and the second support 18 can be changed to be pivotally connected with each other through their end portions, or form a V-shaped butterfly support or an inverted V-shaped support by being directly connected onto the base plate 14 through their end portions. For another example, the first support 16 and the second support 18 can be changed to be opposite and spaced apart (e.g., each of them is rotatably connected to the base plate 14), and a linkage support is used to link the first support 16 and the second support 18. Furthermore, the illuminated keyswitch structures 1 and 3 use the resilient dome 26 as the restoring force mechanism; however, it is not limited thereto in practice. For example, the restoring force mechanism is realized by a spring or a magnetic attraction mechanism.

In practice, as shown by FIG. 10, in the practice, the keycap 12 has a permeable indicator area 12*a*'. The permeable indicator area 12*a*' has a lengthwise direction 12*b*'. The pivot axis A1 is parallel to the lengthwise direction 12*b*' of the permeable indicator area 12*a*'. When the light-emitting dies 22*a*, 22*b* and 22*c* are arranged as shown by FIG. 11A, the light of different colors emitted by the light-emitting dies 22*a*, 22*b* and 22*c* can travel to the ends of the permeable indicator area 12*a*' at similar distances, thereby suppressing the uneven light mixing and color deviation.

Furthermore, the foregoing describes the relative position relationships of the light-emitting dies 22*a*, 22*b* and 22*c* relative to the circuitry of the switch circuit board 20, and the first support 16 and the second support 18 with illuminated keyswitch structures 1 and 3, respectively. In other embodiments, the illuminated keyswitch structure may also have both cases. For example, the switch contact pad 202 is located under the first support 16 or the second support 18 or adjacent to the position under the first support 16 or the second support 18, and the light-emitting dies 22*a*, 22*b* and 22*c* are located under the first support 16 or the second support 18. For another example, the light-emitting dies 22*a*, 22*b* and 22*c* located under the first support 16 or the second support 18 is also adjacent to the circuitry of the switch circuit board 20. Furthermore, in practice, some structural features of each embodiment may also be applied to other embodiments. For example, when the light-emitting dies 22*a*, 22*b* and 22*c* under the base plate 14 is disposed near to the circuitry of the switch circuit board 20, the light-emitting dies 22*a*, 22*b* and 22*c* may be also near edges of the base plate 14, and the above illuminated keyswitch structure 3 is applicable herein.

Although the present invention discloses the above preferably practical ranges of the light-emitting distances d1, d2 and d3 through actual implementation data, in practice, the preferably practical ranges of the light-emitting distances d1, d2 and d3 of the present invention may be used with slightly reducing lighting effect, which still can achieve a certain level of overall optical design benefits. Therefore, an addition or subtraction of 15% to 20% of the upper and lower boundary values of the preferably practical ranges of the light-emitting distances d1, d2 and d3 of the present invention should still belong to the coverage range of the light-emitting distances d1, d2, and d3 of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An illuminated keyswitch structure, characterized by comprising:
- a base plate, having a through hole;
- a keycap, movably disposed above the base plate in a vertical direction;
- a plurality of light-emitting dies, disposed under the keycap, the plurality of light-emitting dies being not higher than the base plate, the plurality of light-emitting dies being located within a projection of the through hole in the vertical direction; and
- a switch circuit board, the switch circuit board being disposed under the keycap and above the plurality of light-emitting dies, wherein the switch circuit board comprises a switch contact pad, a projection of the switch contact pad in the vertical direction is located within a projection of the through hole in the vertical direction, the projection of the switch contact pad in the vertical direction has a flat edge, and the at least two of the plurality of light-emitting dies are arranged parallel to the flat edge.

2. The illuminated keyswitch structure according to claim 1, characterized in that there is a light-emitting distance between the plurality of light-emitting dies and the switch contact pad in a horizontal direction, and the light-emitting distance is between 0.3 mm and 0.5 mm.

3. The illuminated keyswitch structure according to claim 1, characterized in that a portion of a profile of the projection of the through hole in the vertical direction is parallel to a portion of a profile of the projection of the switch contact pad in the vertical direction.

4. The illuminated keyswitch structure according to claim 1, characterized in that the plurality of light-emitting dies are arranged in a polygonal shape.

5. The illuminated keyswitch structure according to claim 1, characterized in that the plurality of light-emitting dies are fixed on a light source circuit board, and the light source circuit board is under the base plate.

6. An illuminated keyswitch structure, characterized by comprising:
- a keycap, movably disposed in a vertical direction, a coverage space of the keycap in the vertical direction having a heterochromatic sensitive area; and
- a plurality of light-emitting dies, arranged under the keycap, the plurality of light-emitting dies emitting light of different colors upward to illuminate the keycap, distances from the plurality of light-emitting dies to the heterochromatic sensitive area being close to each other;

wherein the heterochromatic sensitive area is an end of a permeable indicator area of the keycap, the permeable indicator area defines a long axis, the plurality of light-emitting dies are arranged under the permeable indicator area perpendicular to the long axis and the vertical direction, the plurality of light-emitting dies are located at a same side of a projection of the heterochromatic sensitive area in the vertical direction, and a center of a union range of the plurality of light-emitting dies is located at a center point of the long axis.

7. An illuminated keyswitch structure, characterized by comprising:
- a keycap, movably disposed in a vertical direction, the keycap having a first permeable character closest to a first side edge of the keycap, the keycap having a second permeable character closest to a second side edge of the keycap, the first side edge and the second side edge being parallel and opposite; and
- at least one first light-emitting die, at least one second light-emitting die and at least one third light-emitting die, disposed under the keycap, the at least one first light-emitting die, the at least one second light-emitting die and the at least one third light-emitting die having gaps with each other and producing light of different colors, the first light-emitting die and the second light-emitting die being arranged in a straight line with edges parallel to each other, the third light-emitting die being not located within a union range of the first light-emitting die and the second light-emitting die;

wherein distances from the first light-emitting die and the second light-emitting die to the first permeable character are close to each other, and distances from the first light-emitting die and the second light-emitting die to the second permeable character are close to each other; and wherein the first permeable character and the second permeable character define a permeable indicator area, the permeable indicator area defines a long axis perpendicular to a line connecting the first light-emitting die and the second light-emitting die, and a center of a union range of the first light-emitting die, the second light-emitting die and the third light-emitting die is located at a center point of the long axis.

8. The illuminated keyswitch structure according to claim 7, characterized in that a line connecting the first permeable character and the second permeable character passes through the union range of the first light-emitting die, the second light-emitting die and the third light-emitting die.

9. The illuminated keyswitch structure according to claim 7, characterized in that a line connecting the first permeable character and the second permeable character passes through the third light-emitting die.

10. The illuminated keyswitch structure according to claim 7, characterized in that there is no other light-emitting part under the permeable indicator area, except for the first light-emitting die, the second light-emitting die and the third light-emitting die.

11. An illuminated keyswitch structure, characterized by comprising:
- a first support;
- a second support, disposed opposite to the first support;
- a keycap, supported on the first support and the second support, the keycap being movable in a vertical direction through the first support and the second support, a coverage space of the keycap in the vertical direction having a heterochromatic sensitive area; and a plurality of light-emitting dies, arranged under the keycap, the plurality of light-emitting dies emitting light of different colors upward to illuminate the keycap, distances from the plurality of light-emitting dies to the heterochromatic sensitive area being close to each other;

wherein the heterochromatic sensitive area is a gap projection between the first support and the second support, and the plurality of light-emitting dies as a whole does not overlap the gap projection.

12. The illuminated keyswitch structure according to claim 11, characterized in that the plurality of light-emitting dies are disposed under the first support, and the light emitted by the plurality of light-emitting dies passes through the first support to illuminate the keycap; alternatively, the plurality of light-emitting dies are disposed under the second support, and the light emitted by the plurality of light-emitting dies passes through the second support to illuminate the keycap.

13. The illuminated keyswitch structure according to claim 11, characterized in that when the plurality of light-emitting dies are disposed under the first support, the plurality of light-emitting dies are arranged in an arrangement direction, the first support has a frame portion, a projection of the frame portion in the vertical direction has a lengthwise direction, and the lengthwise direction is parallel to the arrangement direction;

when the plurality of light-emitting dies are disposed under the second support, the plurality of light-emitting dies are arranged in an arrangement direction, the second support has a frame portion, a projection of the frame portion in the vertical direction has a lengthwise direction, and the lengthwise direction is parallel to the arrangement direction.

14. The illuminated keyswitch structure according to claim 11, characterized in that the keycap has a permeable indicator area, the first support and the second support are pivotally connected with each other about a pivot axis, and the pivot axis is parallel to a lengthwise direction of the permeable indicator area.

* * * * *